(12) United States Patent
Lindheimer et al.

(10) Patent No.: US 10,645,572 B2
(45) Date of Patent: *May 5, 2020

(54) METHOD FOR GENERATING A COMMON IDENTIFIER FOR A WIRELESS DEVICE IN AT LEAST TWO DIFFERENT TYPES OF NETWORKS

(71) Applicant: Telefonaktiebolaget LM Ericsson (publ), Stockholm (SE)

(72) Inventors: Christofer Lindheimer, Linköping (SE); Filip Mestanov, Sollentuna (SE); Oumer Teyeb, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 335 days.

This patent is subject to a terminal disclaimer.

(21) Appl. No.: 15/309,945

(22) PCT Filed: Oct. 9, 2014

(86) PCT No.: PCT/SE2014/051189
§ 371 (c)(1),
(2) Date: Nov. 9, 2016

(87) PCT Pub. No.: WO2015/195021
PCT Pub. Date: Dec. 23, 2015

(65) Prior Publication Data
US 2017/0245143 A1    Aug. 24, 2017

Related U.S. Application Data

(60) Provisional application No. 62/013,635, filed on Jun. 18, 2014.

(51) Int. Cl.
*H04W 8/26* (2009.01)
*H04L 29/12* (2006.01)
(Continued)

(52) U.S. Cl.
CPC .......... *H04W 8/26* (2013.01); *H04L 61/1588* (2013.01); *H04L 61/6022* (2013.01);
(Continued)

(58) Field of Classification Search
CPC .................. H04W 8/00; H04L 61/00
See application file for complete search history.

(56) References Cited

U.S. PATENT DOCUMENTS 7,535,880 B1    5/2009  Hinman et al.
8,594,628 B1    11/2013 Schroeder et al.
(Continued)

FOREIGN PATENT DOCUMENTS

EP    1531645 A1    5/2005
EP    2709418 A2    3/2014
(Continued)

OTHER PUBLICATIONS

3rd Generation Partnership Project, 3rd Generation Partnership Project; Technical Specification Group Services and System Aspects; Architecture enhancements for non-3GPP accesses (Release 12); Technical Specification, 3GPP TS 23.402 V12.4.0, Mar. 1, 2014, pp. 1-288, 3GPP, France.
(Continued)

*Primary Examiner* — Andrew Lai
*Assistant Examiner* — Sumitra Ganguly
(74) *Attorney, Agent, or Firm* — Coats + Bennett, PLLC

(57) ABSTRACT

The proposed technology generally relates to wireless communication, and more specifically to a method for generating an identifier for a wireless device (30), a method for identifying a wireless device (30) in a wireless communication environment, a method for assisting in the exchange of information for a wireless device (30) between at least two different types of wireless networks such as a WLAN (10) and a cellular network (20), a method for linking
(Continued)

context information of a wireless device (30) between different types of wireless networks, and a method for supporting access selection and/or mobility decision in a wireless communication environment, as well as corresponding systems, apparatuses, communication devices, network nodes, computer programs, and computer program products. The proposed technology is based on an identifier of Medium Access Control, MAC, address format, wherein the identifier of MAC address format enables identification of the wireless device (30) in the WLAN (10), and the common identifier also represents information that enables identification of the wireless device (30) in the cellular network (20).

17 Claims, 19 Drawing Sheets

(51) Int. Cl.
  *H04W 84/12* (2009.01)
  *H04W 88/06* (2009.01)
  *H04W 36/14* (2009.01)
  *H04W 88/08* (2009.01)

(52) U.S. Cl.
  CPC ............ *H04W 36/14* (2013.01); *H04W 84/12* (2013.01); *H04W 88/06* (2013.01); *H04W 88/08* (2013.01)

(56) References Cited

U.S. PATENT DOCUMENTS

| | | | |
|---|---|---|---|
| 2006/0253530 A1* | 11/2006 | Wu | H04L 12/2859 709/204 |
| 2008/0013539 A1 | 1/2008 | Poyhonen et al. | |
| 2008/0182565 A1* | 7/2008 | Lazaridis | H04M 3/42246 370/328 |
| 2011/0105153 A1* | 5/2011 | Miklos | H04W 60/04 455/456.5 |
| 2013/0084795 A1* | 4/2013 | Van Phan | H04B 7/15592 455/15 |
| 2013/0095789 A1* | 4/2013 | Keevill | H04W 12/06 455/411 |
| 2014/0092885 A1 | 4/2014 | Venkatachalam et al. | |
| 2014/0192735 A1* | 7/2014 | Sridharan | H04W 8/26 370/329 |
| 2014/0341041 A1* | 11/2014 | Velev | H04Q 3/0045 370/236 |

FOREIGN PATENT DOCUMENTS

| | | |
|---|---|---|
| WO | 0169954 A1 | 9/2001 |
| WO | 2007120945 A2 | 10/2007 |
| WO | 2008059758 A1 | 5/2008 |
| WO | 2013056143 A1 | 4/2013 |
| WO | 2014067565 A1 | 5/2014 |

OTHER PUBLICATIONS

Haverinen, H., et al., "Extensible Authentication Protocol Method for Global System for Mobile Communications,(GSM) Subscriber Identity Modules (EAP-SIM)", Network Working Group, Jan. 1, 2006, pp. 1-86, The Internet Society, RFC 4186.

Aboba, B., et al., "RADIUS (Remote Authentication Dial in User Service) Support for Extensible Authentication Protocol (EAP)", Network Working Group, Sep. 1, 2003, pp. 1-43, The Internet Society, RFC 3579.

IEEE, "IEEE Standard for Local and metropolitan area networks—Port-Based Network Access Control", IEEE Computer Society, Feb. 5, 2010, pp. 1-222, IEEE Std 802.1X-2010, IEEE.

IEEE Standards Association, "IEEE Standard for Information technology—Telecommunications and information exchange between systems Local and metropolitan area networks—Specific requirements. Part 11: Wireless LAN Medium Access Control (MAC) and Physical Layer (PHY) Specifications", IEEE Computer Society, Mar. 29, 2012, pp. 1-2793, IEEE Std 802.11-2012, IEEE.

\* cited by examiner

METHOD FOR GENERATING A COMMON IDENTIFIER FOR A WIRELESS DEVICE IN AT LEAST TWO DIFFERENT TYPES OF NETWORKS

TECHNICAL FIELD

The proposed technology generally relates to wireless communication, and more specifically to a method for generating an identifier for a wireless device, a method for identifying a wireless device in a wireless communication environment, a method for assisting in the exchange of information for a wireless device between at least two different types of wireless networks, a method for linking context information of a wireless device between different types of wireless networks, and a method for supporting access selection and/or mobility decision in a wireless communication environment, as well as corresponding systems, apparatuses, communication devices, network nodes, computer programs, and computer program products.

BACKGROUND

There is a general demand for efficient identification of a wireless device in a wireless communication environment. More specifically, there is a need for generating an identifier for a wireless device and for identifying a wireless device in a wireless communication environment.

There may also be a need for exchanging information between different types of wireless networks based on the identification of a wireless device, and/or for linking context information of a wireless device between different types of wireless networks, and/or for supporting access selection and/or mobility decision for a wireless device in a wireless communication environment. By way of example, this is relevant in a wireless communication environment including a cellular radio communication network and a Wireless Local Area Network, WLAN, to enable efficient interworking between a cellular network and a WLAN such as a Wi-Fi network.

By way of example, mobile operators are today mainly using Wi-Fi to offload traffic from the mobile networks but the opportunity to improve end user experience regarding performance is also becoming more important. The current Wi-Fi deployments are mainly totally separate from mobile networks, and are to be seen as non-integrated. The usage of Wi-Fi is mainly driven due to the free and wide unlicensed spectrum, and the increased availability of Wi-Fi in mobile terminals like smartphones and tablets. The end users are also becoming more and more at ease with using Wi-Fi for example at offices and homes.

The different business segments for Wi-Fi regarding integration possibilities can be divided into mobile operator hosted/controlled vs. 3rd party hosted/controlled Wi-Fi APs (here 3rd party is seen as anything else than mobile operator and that the 3rd party is not totally "trusted" by the mobile operator. 3rd party could be for example a Wi-Fi operator or an end-user him/herself). In both segments there exist public/hotspot, enterprise and residential deployments.

Wi-Fi integration towards the mobile core network is emerging as a good way to improve the end user experience further. These solutions consist mainly of the components: common authentication between 3GPP and Wi-Fi, and integration of Wi-Fi user plane traffic to the mobile core network. The common authentication is based on automatic SIM-based authentication in both access types. The Wi-Fi user plane integration provides the mobile operator the opportunity to provide the same services, like parental control and subscription based payment methods, for the end users when connected both via 3GPP and via Wi-Fi. Different solutions are standardized in 3GPP: Overlay solutions (S2b, S2c) are specified since 3GPP Rel-8 while integration solutions (S2a) are currently work-in-progress (S2a, S2b, S2c indicating the 3GPP interface/reference point name towards the PDN-GW). These solutions are specified in 3GPP TS 23.402.

For example, a mobility decision normally requires that both the context of a wireless device such as a UE or mobile station in the cellular network and the WLAN are available in order to take an optimum access selection decision. Currently, the only common UE identifier in both the cellular network domain and the WLAN domain is the International Mobile Subscriber Identity, IMSI. The problem is that the IMSI is not available before EAP authentication is initiated, and hence the mobility decision entity needs to have the wireless device perform an Open System Authentication in WLAN in order to obtain the IMSI and link the context of the wireless device in WLAN to the context in the cellular domain. This approach takes time and normally leads to inefficient usage of resources. For example, a wireless device such as a UE could be denied access to WLAN by the mobility decision function; and even though access has been denied and the UE is not using the WLAN network, it still had to connect and send several Over-The-Air, OTA, messages. Furthermore, for security purposes most wireless devices such as UEs nowadays will not expose their permanent identity, i.e. IMSI, and this generally prevents the WLAN network from obtaining the permanent identity right away.

SUMMARY

It is an object to provide a method and corresponding system and apparatus for generating an identifier for a wireless device in a wireless communication environment.

It is an object to provide a method and corresponding apparatus for identifying a wireless device in a wireless communication environment.

It is an object to provide a method and corresponding apparatus for assisting in the exchange of information between at least two different types of wireless networks.

It is an object to provide a method and corresponding apparatus for linking context information of a wireless device between different types of wireless networks.

It is an object to provide a method and corresponding apparatus for supporting access selection and/or mobility decision in a wireless communication environment.

It is also an object to provide corresponding communication device(s), network node(s) and/or computer program(s) and/or computer program product(s).

These and other objects are met by at least one embodiment of the proposed technology.

According to a first aspect, there is provided a method of generating an identifier for a wireless device in a wireless communication environment, wherein said method comprises the step of generating a common identifier for the wireless device in at least two different types of networks including a Wireless Local Area Network, WLAN, and a cellular radio communication network, wherein said common identifier is of Medium Access Control, MAC, address format, and the common identifier of MAC address format enables identification of the wireless device in the WLAN, and the common identifier also represents information that enables identification of the wireless device in a cellular radio communication network.

In this way, a common identifier is provided that is useful in both a WLAN and a cellular radio communication network.

There is also provided an apparatus or system configured to generate an identifier for a wireless device in a wireless communication environment, wherein said apparatus is configured to generate a common identifier for the wireless device in at least two different types of networks including a Wireless Local Area Network, WLAN, and a cellular radio communication network, wherein said common identifier is of Medium Access Control, MAC, address format, and the common identifier of MAC address format enables identification of the wireless device in the WLAN, and the common identifier also represents information that enables identification of the wireless device in a cellular radio communication network.

There is also provided an apparatus configured to generate an identifier for a wireless device in a wireless communication environment, wherein the apparatus comprises a processor and a memory, the memory comprising instructions executable by the processor, whereby the processor is operative to generate a common identifier for the wireless device in at least two different types of networks including a Wireless Local Area Network, WLAN, and a cellular radio communication network, wherein said common identifier is of Medium Access Control, MAC, address format, and the common identifier of MAC address format enables identification of the wireless device in the WLAN, and the common identifier also represents information that enables identification of the wireless device in a cellular radio communication network.

There is also provided a computer program comprising instructions, which when executed by at least one processor, cause the at least one processor to generate a common identifier for a wireless device in at least two different types of networks including a Wireless Local Area Network, WLAN, and a cellular radio communication network, wherein said common identifier is of Medium Access Control, MAC, address format, and the common identifier of MAC address format enables identification of the wireless device in the WLAN, and the common identifier also represents information that enables identification of the wireless device in a cellular radio communication network.

There is also provided a corresponding computer program product.

There is also provided an apparatus for generating an identifier for a wireless device in a wireless communication environment, wherein the apparatus comprises a generating module for generating a common identifier for the wireless device in at least two different types of networks including a Wireless Local Area Network, WLAN, and a cellular radio communication network, wherein said common identifier is of Medium Access Control, MAC, address format, and the common identifier of MAC address format enables identification of the wireless device in the WLAN, and the common identifier also represents information that enables identification of the wireless device in a cellular radio communication network.

There is also provided a communication device comprising an apparatus/system as defined above.

According to a second aspect, there is provided a method for identifying a wireless device in a wireless communication environment, wherein said method comprises the steps of:

receiving an identifier of Medium Access Control, MAC, address format from the wireless device communicating with a Wireless Local Area Network, WLAN, wherein the identifier of MAC address format enables identification of the wireless device in the WLAN, and the identifier also represents information that enables identification of the wireless device in a cellular radio communication network;

identifying the wireless device in the WLAN based on the identifier; and identifying the wireless device in the cellular radio communication network based on the identifier.

This provides efficient identification of a wireless device in a wireless communication environment including both a WLAN and a cellular radio communication network.

There is also provided an apparatus configured to identify a wireless device in a wireless communication environment, wherein said apparatus is configured to receive an identifier of Medium Access Control, MAC, address format from the wireless device communicating with a Wireless Local Area Network, WLAN, wherein the identifier of MAC address format enables identification of the wireless device in the WLAN, and the identifier also represents information that enables identification of the wireless device in a cellular radio communication network;

wherein said apparatus is configured to identify the wireless device in the WLAN based on the identifier; and wherein said apparatus is configured to identify the wireless device in the cellular radio communication network based on the identifier.

There is also provided an apparatus configured to identify a wireless device in a wireless communication environment, wherein the apparatus comprises a processor and a memory, the memory comprising instructions executable by the processor, whereby the processor is operative to:

read an identifier of Medium Access Control, MAC, address format from the wireless device communicating with a Wireless Local Area Network, WLAN, wherein the identifier of MAC address format enables identification of the wireless device in the WLAN, and the identifier also represents information that enables identification of the wireless device in a cellular radio communication network;

identify the wireless device in the WLAN based on the identifier; and identify the wireless device in the cellular radio communication network based on the identifier.

There is also provided a computer program comprising instructions, which when executed by at least one processor, cause the at least one processor to:

read an identifier of Medium Access Control, MAC, address format from the wireless device communicating with a Wireless Local Area Network, WLAN, wherein the identifier of MAC address format enables identification of the wireless device in the WLAN, and the identifier also represents information that enables identification of the wireless device in a cellular radio communication network;

identify the wireless device in the WLAN based on the identifier; and identify the wireless device in the cellular radio communication network based on the identifier.

There is also provided a corresponding computer program product.

There is also provided an apparatus for identifying a wireless device in a wireless communication environment, wherein said apparatus comprises:
- a reading module for reading an identifier of Medium Access Control, MAC, address format from the wireless device communicating with a Wireless Local Area Network, WLAN, wherein the identifier of MAC address format enables identification of the wireless device in the WLAN, and the identifier also represents information that enables identification of the wireless device in a cellular radio communication network; and
- a first identification module for identifying the wireless device in the WLAN based on the identifier; and
- a second identification module for identifying the wireless device in the cellular radio communication network based on the identifier.

There is also provided a network node comprising an apparatus as defined above.

According to a third aspect, there is provided a method for assisting in the exchange of information for a wireless device between at least two different types of wireless networks including a Wireless Local Area Network, WLAN, and a cellular radio communication network, wherein said method comprises the steps of:
- receiving an identifier of Medium Access Control, MAC, address format from the wireless device communicating with the WLAN, wherein the identifier of MAC address format enables identification of the wireless device in the WLAN, and the identifier also represents information that enables identification of the wireless device in the cellular radio communication network; and
- assisting, based on the identifier of MAC address format, in the exchange of information for the wireless device between the WLAN and the cellular radio communication network.

This effectively supports exchange of information between the networks based on the identification of a wireless device.

There is also provided an apparatus configured to assist in the exchange of information between at least two different types of networks including a Wireless Local Area Network, WLAN, and a cellular radio communication network,
- wherein said apparatus is configured to receive an identifier of Medium Access Control, MAC, address format from a wireless device communicating with the WLAN, wherein the identifier of MAC address format enables identification of the wireless device in the WLAN, and the identifier also represents information that enables identification of the wireless device in the cellular radio communication network; and
- wherein said apparatus is configured to assist, based on the identifier of MAC address format, in the exchange of information for the wireless device between the WLAN and the cellular radio communication network.

There is also provided an apparatus configured to assist in the exchange of information between at least two different types of networks including a Wireless Local Area Network, WLAN, and a cellular radio communication network, wherein the apparatus comprises a processor and a memory, the memory comprising instructions executable by the processor, whereby the processor is operative to:
- read an identifier of Medium Access Control, MAC, address format from a wireless device communicating with the WLAN, wherein the identifier of MAC address format enables identification of the wireless device in the WLAN, and the identifier also represents information that enables identification of the wireless device in the cellular radio communication network; and
- assist, based on the identifier of MAC address format, in the exchange of information for the wireless device between the WLAN and the cellular radio communication network.

There is also provided a computer program comprising instructions, which when executed by at least one processor, cause the at least one processor to:
- read an identifier of Medium Access Control, MAC, address format from a wireless device communicating with a Wireless Local Area Network, WLAN, wherein the identifier of MAC address format enables identification of the wireless device in the WLAN, and the identifier also represents information that enables identification of the wireless device in a cellular radio communication network; and
- assisting, based on the identifier of MAC address format, in the exchange of information for the wireless device between the WLAN and the cellular radio communication network.

There is also provided a corresponding computer program product.

There is also provided an apparatus for assisting in the exchange of information between at least two different types of networks including a Wireless Local Area Network, WLAN, and a cellular radio communication network, wherein said apparatus comprises:
- a reading module for reading an identifier of Medium Access Control, MAC, address format from a wireless device communicating with the WLAN, wherein the identifier of MAC address format enables identification of the wireless device in the WLAN, and the identifier also represents information that enables identification of the wireless device in the cellular radio communication network; and
- an assisting module for assisting, based on the identifier of MAC address format, in the exchange of information for the wireless device between the WLAN and the cellular radio communication network.

There is also provided a network node comprising an apparatus as defined above.

According to a fourth aspect, there is provided a method for linking context information of a wireless device between different types of wireless networks, wherein said method comprises the steps of:
- receiving an identifier of Medium Access Control, MAC, address format from the wireless device communicating within a Wireless Local Area Network, WLAN, wherein the identifier of MAC address format enables identification of the wireless device in the WLAN, and the identifier also represents information that enables identification of the wireless device in a cellular radio communication network;
- requesting, based on the identifier of MAC address format, context information of the wireless device valid in the cellular radio communication network;
- receiving the requested context information of the wireless device valid in the cellular radio communication network; and
- linking the received context information of the wireless device valid in the cellular radio communication network with context information of the wireless device valid in the WLAN.

This provides an efficient way of linking context information of a wireless device between different types of wireless networks. For example, this is particularly important for efficient interworking between a cellular network and a WLAN.

There is also provided an apparatus configured to link context information of a wireless device between different types of wireless networks,
wherein said apparatus is configured to receive an identifier of Medium Access Control, MAC, address format from the wireless device communicating within a Wireless Local Area Network, WLAN, wherein the identifier of MAC address format enables identification of the wireless device in the WLAN, and the identifier also represents information that enables identification of the wireless device in a cellular radio communication network;
wherein said apparatus is configured to request, based on the identifier of MAC address format, context information of the wireless device valid in the cellular radio communication network;
wherein said apparatus is configured to receive the requested context information of the wireless device valid in the cellular radio communication network; and
wherein said apparatus is configured to link the received context information of the wireless device valid in the cellular radio communication network with context information of the wireless device valid in the WLAN.

There is also provided an apparatus configured to link context information of a wireless device between different types of wireless networks, wherein the apparatus comprises a processor and a memory, the memory comprising instructions executable by the processor, whereby the processor is operative to:
read an identifier of Medium Access Control, MAC, address format from the wireless device communicating within a Wireless Local Area Network, WLAN, wherein the identifier of MAC address format enables identification of the wireless device in the WLAN, and the identifier also represents information that enables identification of the wireless device in a cellular radio communication network;
trigger a request, based on the identifier of MAC address format, for context information of the wireless device valid in the cellular radio communication network;
read the requested context information of the wireless device valid in the cellular radio communication network; and
link the context information of the wireless device valid in the cellular radio communication network with context information of the wireless device valid in the WLAN.

There is also provided a computer program comprising instructions, which when executed by at least one processor, cause the at least one processor to:
read an identifier of Medium Access Control, MAC, address format from the wireless device communicating within a Wireless Local Area Network, WLAN, wherein the identifier of MAC address format enables identification of the wireless device in the WLAN, and the identifier also represents information that enables identification of the wireless device in a cellular radio communication network;
trigger a request, based on the identifier of MAC address format, for context information of the wireless device valid in the cellular radio communication network;
read the requested context information of the wireless device valid in the cellular radio communication network; and
link the context information of the wireless device valid in the cellular radio communication network with context information of the wireless device valid in the WLAN.

There is also provided a corresponding computer program product.

There is also provided an apparatus for linking context information of a wireless device between different types of wireless networks, wherein said apparatus comprises:
a reading module for reading an identifier of Medium Access Control, MAC, address format from the wireless device communicating within a Wireless Local Area Network, WLAN, wherein the identifier of MAC address format enables identification of the wireless device in the WLAN, and the identifier also represents information that enables identification of the wireless device in a cellular radio communication network;
a trigger module for triggering a request, based on the identifier of MAC address format, for context information of the wireless device valid in the cellular radio communication network;
a reading module for reading the requested context information of the wireless device valid in the cellular radio communication network; and
a linking module for linking the received context information of the wireless device valid in the cellular radio communication network with context information of the wireless device valid in the WLAN.

There is also provided a network node comprising an apparatus as defined above.

According to a fifth aspect, there is provided a method for supporting access selection and/or mobility decision in a wireless communication environment, wherein said method comprises the steps of:
receiving an identifier of Medium Access Control, MAC, address format from a wireless device communicating within a Wireless Local Area Network, WLAN, wherein the identifier of MAC address format enables identification of the wireless device in the WLAN, and the identifier also represents information that enables identification of the wireless device in a cellular radio communication network;
requesting, based on the identifier of MAC address format, context information and/or radio access related information valid for the wireless device in the cellular radio communication network; and
receiving the requested context information and/or radio access related information valid for the wireless device in the cellular radio communication network; and
compiling information for access selection and/or mobility decision based on the received context information and/or radio access related information valid for the wireless device in the cellular radio communication network and context information and/or radio access related information valid for the wireless device in the WLAN.

This provides useful support for access selection and/or mobility decision in a wireless communication environment. For example, this is particularly important for efficient interworking between a cellular network and a WLAN.

There is also provided an apparatus configured to support access selection and/or mobility decision in a wireless communication environment,
wherein said apparatus is configured to receive an identifier of Medium Access Control, MAC, address format from a wireless device communicating within a Wireless Local Area Network, WLAN, wherein the identifier of MAC address format enables identification of the wireless device in the WLAN, and the identifier also represents information that enables identification of the wireless device in a cellular radio communication network; and wherein said apparatus is configured to request, based on the identifier of MAC address format, context information and/or radio access related information valid for the wireless device in the cellular radio communication network;

wherein said apparatus is configured to receive the requested context information and/or radio access related information valid for the wireless device in the cellular radio communication network; and wherein said apparatus is configured to compile information for access selection and/or mobility decision based on the received context information and/or radio access related information valid for the wireless device in the cellular radio communication network and context information and/or radio access related information valid for the wireless device in the WLAN.

There is also provided an apparatus configured to support access selection and/or mobility decision in a wireless communication environment, wherein the apparatus comprises a processor and a memory, the memory comprising instructions executable by the processor, whereby the processor is operative to:

read an identifier of Medium Access Control, MAC, address format from a wireless device communicating within a Wireless Local Area Network, WLAN, wherein the identifier of MAC address format enables identification of the wireless device in the WLAN, and the identifier also represents information that enables identification of the wireless device in a cellular radio communication network;

trigger a request, based on the identifier of MAC address format, for context information and/or radio access related information valid for the wireless device in the cellular radio communication network;

read the requested context information and/or radio access related information valid for the wireless device in the cellular radio communication network; and compile information for access selection and/or mobility decision based on the received context information and/or radio access related information valid for the wireless device in the cellular radio communication network and context information and/or radio access related information valid for the wireless device in the WLAN.

There is also provided a computer program comprising instructions, which when executed by at least one processor, cause the at least one processor to:

read an identifier of Medium Access Control, MAC, address format from a wireless device communicating within a Wireless Local Area Network, WLAN, wherein the identifier of MAC address format enables identification of the wireless device in the WLAN, and the identifier also represents information that enables identification of the wireless device in a cellular radio communication network;

trigger a request, based on the identifier of MAC address format, for context information and/or radio access related information valid for the wireless device in the cellular radio communication network;

read the requested context information and/or radio access related information valid for the wireless device in the cellular radio communication network; and compile information for access selection and/or mobility decision based on the received context information and/or radio access related information valid for the wireless device in the cellular radio communication network and context information and/or radio access related information valid for the wireless device in the WLAN.

There is also provided a corresponding computer program product.

There is also provided an apparatus for supporting access selection and/or mobility decision in a wireless communication environment, wherein said apparatus comprises:

a reading module for reading an identifier of Medium Access Control, MAC, address format from a wireless device communicating within a Wireless Local Area Network, WLAN, wherein the identifier of MAC address format enables identification of the wireless device in the WLAN, and the identifier also represents information that enables identification of the wireless device in a cellular radio communication network; and a trigger module for triggering a request, based on the identifier of MAC address format, for context information and/or radio access related information valid for the wireless device in the cellular radio communication network;

a reading module for reading the requested context information and/or radio access related information valid for the wireless device in the cellular radio communication network; and a compiling module for compiling information for access selection and/or mobility decision based on the received context information and/or radio access related information valid for the wireless device in the cellular radio communication network and context information and/or radio access related information valid for the wireless device in the WLAN.

There is also provided a network node comprising an apparatus as defined above.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

For a better understanding of the proposed technology, it may be useful to begin with a brief overview of an example of wireless communication environment based on different types of networks.

Figure 1:
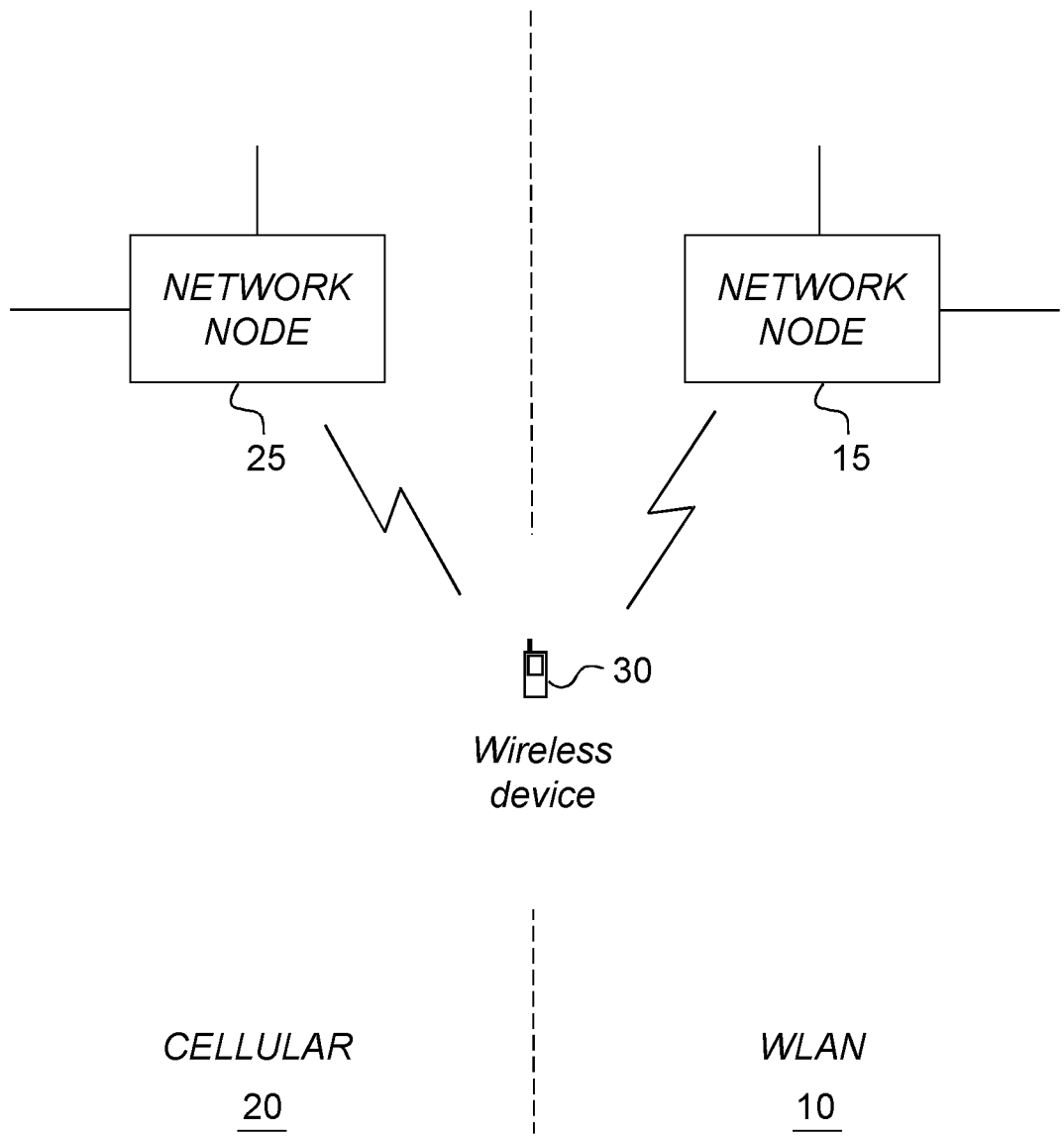
FIG. 1 is a schematic diagram illustrating an example of wireless communication environment based on at least two different types of networks.

FIG. 1 is a schematic diagram illustrating an example of wireless communication environment based on at least two different types of networks including a Wireless Local Area Network, WLAN, 10 and a cellular radio communication network 20. The cellular network may 20 include one or more network nodes 25 such as one or more base stations and/or network controllers. The WLAN 10 may include one or network nodes 15 such as one or more access points and/or access controllers. A wireless device 30 may be communicating within the cellular network and/or the WLAN. By way of example, the wireless device 30, such as a mobile terminal, UE, and/or mobile station may initially be served by the cellular network 20. Potentially, the wireless device 30 may be off-loaded to the WLAN 10, if appropriate from a radio access and/or load related perspective. The wireless device 30 may be in communication with both networks, although just being served by one of the networks. For example, while being served by the cellular network 20, the wireless device may contact the WLAN 10, e.g. by sending probe and/or association requests to the WLAN. Depending on the situation, the wireless device 30 may be 'handed over' from the cellular network 20 to the WLAN 10, or vice versa.

According to a first aspect, there is provided a method of generating an identifier for a wireless device in a wireless communication environment, wherein said method comprises the step S1 of generating a common identifier for the wireless device in at least two different types of networks including a Wireless Local Area Network, WLAN, and a cellular radio communication network, wherein said common identifier is of Medium Access Control, MAC, address format, and the common identifier of MAC address format enables identification of the wireless device in the WLAN, and the common identifier also represents information that enables identification of the wireless device in a cellular radio communication network.

Figure 2A:
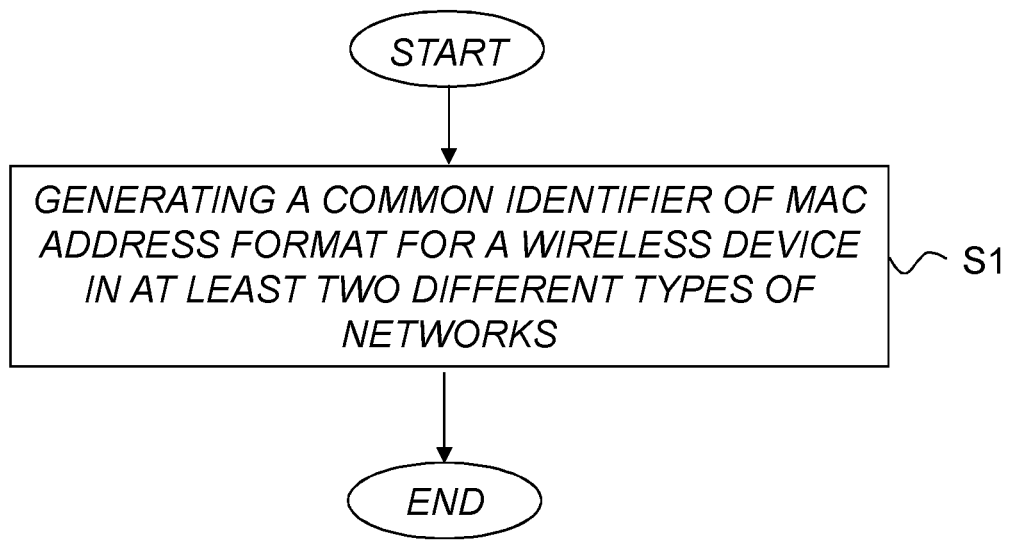
FIG. 2A is a schematic flow diagram illustrating an example of a method of generating an identifier for a wireless device in a wireless communication environment according to an embodiment.

Reference can be made to the schematic diagram of FIG. 2A illustrating an example of a method of generating an identifier for a wireless device in a wireless communication environment according to an embodiment.

There is also provided an apparatus or system configured to generate an identifier for a wireless device in a wireless communication environment, wherein said apparatus is configured to generate a common identifier for the wireless device in at least two different types of networks including a Wireless Local Area Network, WLAN, and a cellular radio communication network, wherein said common identifier is of Medium Access Control, MAC, address format, and the common identifier of MAC address format enables identification of the wireless device in the WLAN, and the common identifier also represents information that enables identification of the wireless device in a cellular radio communication network.

In this way, a common identifier is provided that is useful in both a WLAN and a cellular radio communication network.

By way of example, if the common identifier is inserted in the MAC address field in one or more messages sent to the WLAN, information that enables identification of the wireless device in the cellular radio communication network can be conveyed directly or at least very early in the communication sequence with the WLAN. For example, the common identifier can be sent in the probe request and/or association request messages in the MAC address field. As an example, the common identifier could be used as the MAC address in the WLAN world since it is of MAC address format, and at the same time be used to enable identification of the wireless device in the cellular world.

In other words, this means that the identifier is located in the MAC address field in one or more messages for the WLAN such as probe request and/or association request messages.

In a particular embodiment, the common identifier is inserted in the MAC address field of all messages sent to the WLAN network node(s).

There is also provided an apparatus 100 configured to generate an identifier for a wireless device in a wireless communication environment, wherein the apparatus comprises a processor 110 and a memory 120, the memory comprising instructions executable by the processor, whereby the processor is operative to generate a common identifier for the wireless device in at least two different types of networks including a Wireless Local Area Network, WLAN, and a cellular radio communication network, wherein said common identifier is of Medium Access Control, MAC, address format, and the common identifier of MAC address format enables identification of the wireless device in the WLAN, and the common identifier also represents information that enables identification of the wireless device in a cellular radio communication network.

Figure 13:
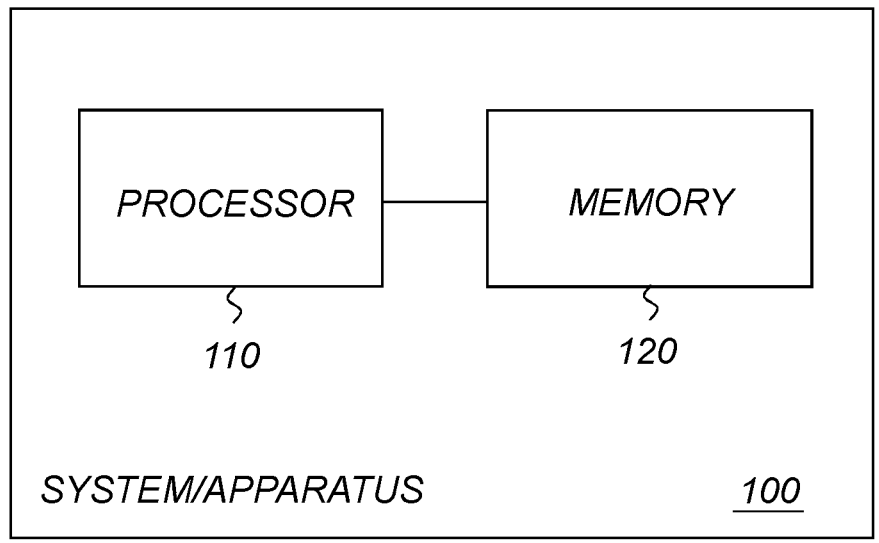
FIG. 13 is a schematic block diagram illustrating an example of a system/apparatus according to an embodiment.

Reference can be made to the schematic block diagram of FIG. 13 illustrating an example of a system/apparatus according to an embodiment.

There is also provided a computer program 525; 535 comprising instructions, which when executed by at least one processor, cause the at least one processor to generate a common identifier for a wireless device in at least two different types of networks including a Wireless Local Area Network, WLAN, and a cellular radio communication network, wherein said common identifier is of Medium Access Control, MAC, address format, and the common identifier of MAC address format enables identification of the wireless device in the WLAN, and the common identifier also represents information that enables identification of the wireless device in a cellular radio communication network.

Figure 17:
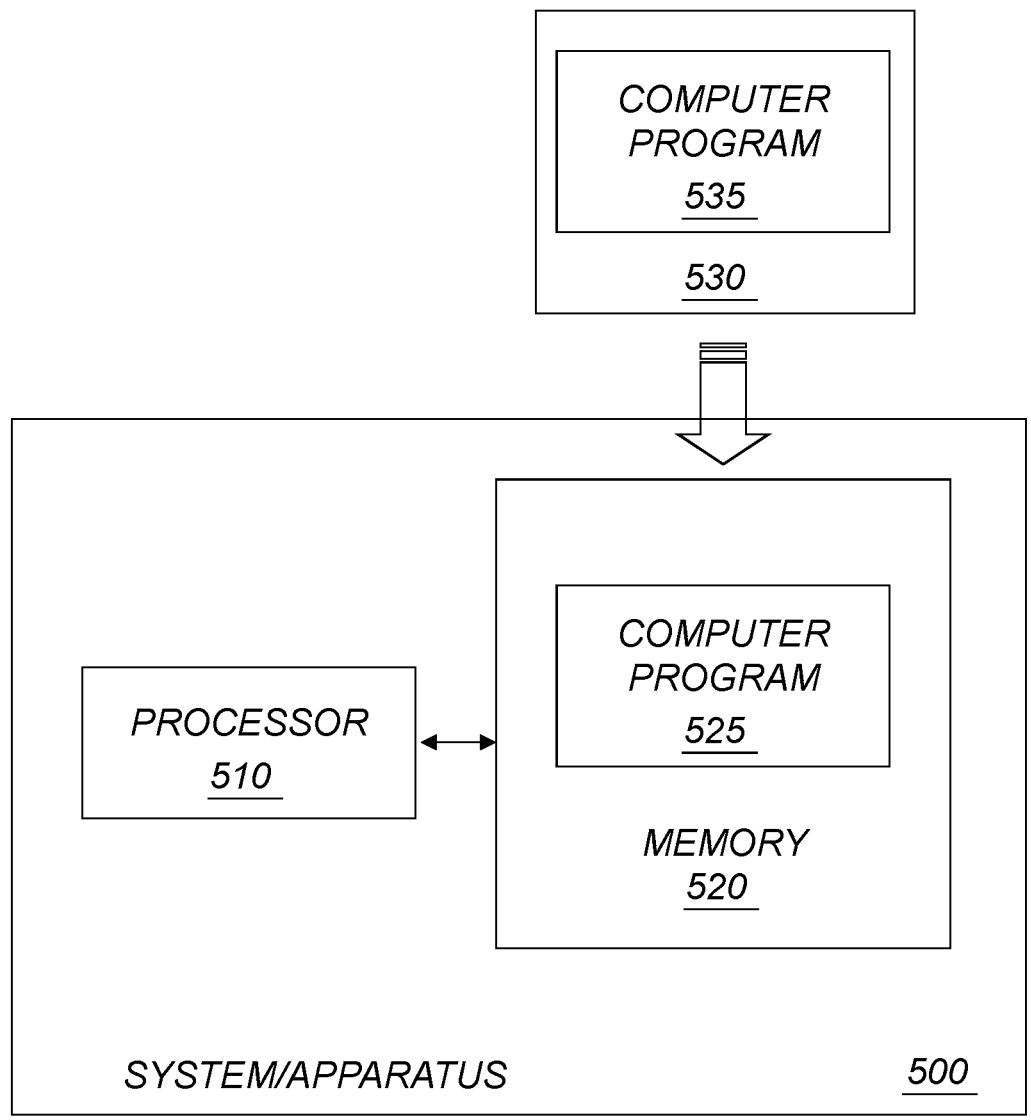
FIG. 17 is a schematic block diagram illustrating an example of a system/apparatus and a computer program according to an embodiment.

Reference can be made to the schematic block diagram of FIG. 17.

There is also provided an apparatus 600 for generating an identifier for a wireless device in a wireless communication environment, wherein the apparatus comprises a generating module 610 for generating a common identifier for the wireless device in at least two different types of networks including a Wireless Local Area Network, WLAN, and a cellular radio communication network, wherein said common identifier is of Medium Access Control, MAC, address format, and the common identifier of MAC address format enables identification of the wireless device in the WLAN, and the common identifier also represents information that enables identification of the wireless device in a cellular radio communication network.

Figure 18:
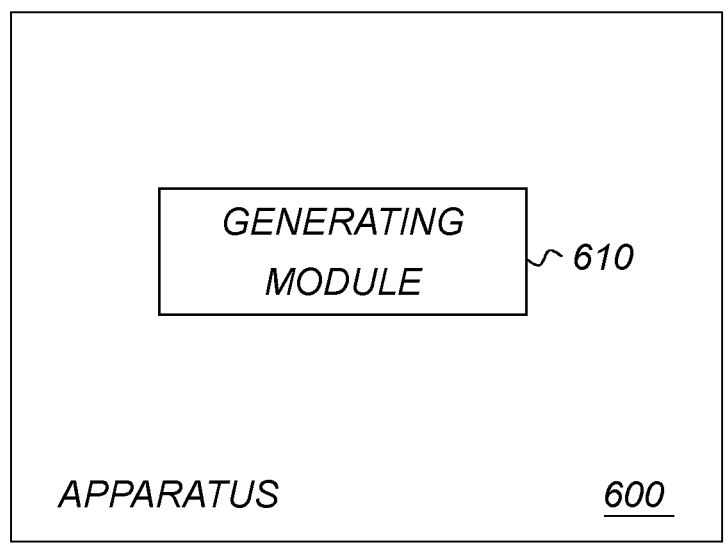
FIG. 18 is a schematic block diagram illustrating an example of an apparatus according to an embodiment.

Reference can be made to the schematic block diagram of FIG. 18.

There is also provided a communication device 200 comprising an apparatus/system 100 as defined above.

Figure 14:
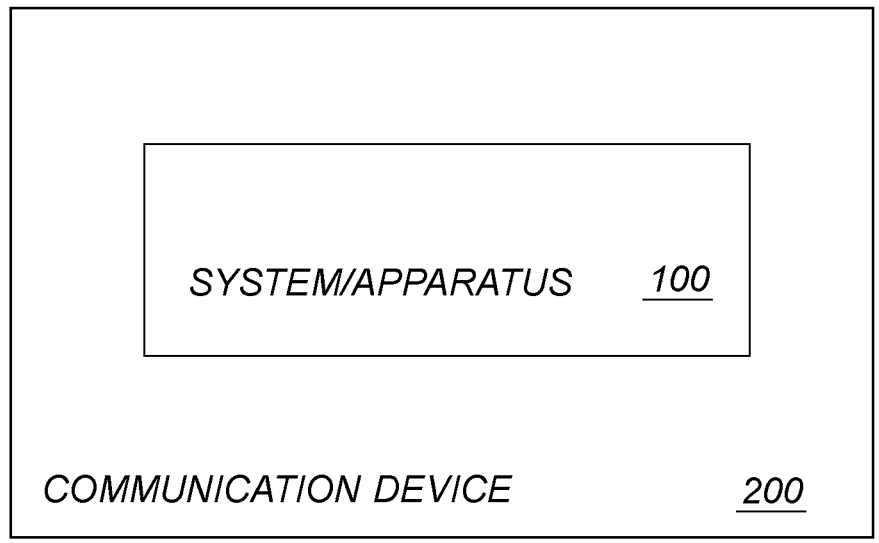
FIG. 14 is a schematic block diagram illustrating an example of a communication device comprising a system/apparatus according to an embodiment.

Reference can be made to the schematic block diagram of FIG. 14.

By way of example, the communication device 200 is a wireless device or a network node serving and/or controlling the wireless device.

As an example, the wireless device is a mobile terminal.

By way of example, the WLAN network is a Wi-Fi network.

In an optional embodiment, the cellular radio communication network is a communication network operating according to a 3rd Generation Partnership Project, 3GPP, standard.

In an optional embodiment, the cellular radio communication network is a 3rd Generation Partnership Project, 3GPP, network, and the information that enables identification of the wireless device in a cellular radio communication network is 3GPP information enabling identification of the wireless device in the 3GPP network.

In an optional embodiment, the cellular radio communication network is one of the following: a GSM, GPRS, EDGE, UMTS, HSPA, HSPA+, LTE, LTE-Advanced, and IMT-advanced compliant network.

In an optional embodiment, the identifier of MAC address format is generated based on information that enables identification of the wireless device in a cellular radio communication network.

By way of example, the information that enables identification of the wireless device in a cellular radio communication network is representative of the identity of the wireless device in the cellular radio communication network.

For example, the information that enables identification of the wireless device in a cellular radio communication network is representative of the identity of the wireless device on the radio access network level In a particular example, the information that enables identification of the wireless device in a cellular radio communication network is representative of the Cell Radio Network Temporary Identifier, C-RNTI.

In another example, the information that enables identification of the wireless device in a cellular radio communication network is representative of the identity of the wireless device on the mobility management level.

For example, the information that enables identification of the wireless device in a cellular radio communication network is representative of a Mobility Management Entity, MME, identifier and a MME-Temporary Mobile Subscriber Identity, M-TMSI.

As another example, the information that enables identification of the wireless device in a cellular radio communication network is representative of at least part of a 3GPP Global Unique Temporary Identifier, GUTI.

In an optional embodiment, the identifier of MAC address format is generated also based on a cell identity of a serving cell of the wireless device in the cellular radio communication network.

In an optional embodiment, the method further comprises the step of providing S0 the information that enables identification of the wireless device in a cellular radio communication network.

By way of example, the providing step S0 may comprise the step of determining the information that enables identification of the wireless device in a cellular radio communication network or receiving the information that enables identification of the wireless device in a cellular radio communication network.

In an optional embodiment, the method further comprises the step of transmitting S2 the common identifier of MAC address format to a network node of the WLAN to enable the WLAN network node to contact a network node of the cellular network for exchange of information related to the cellular radio communication network for access selection and/or mobility decision.

Figure 2B:
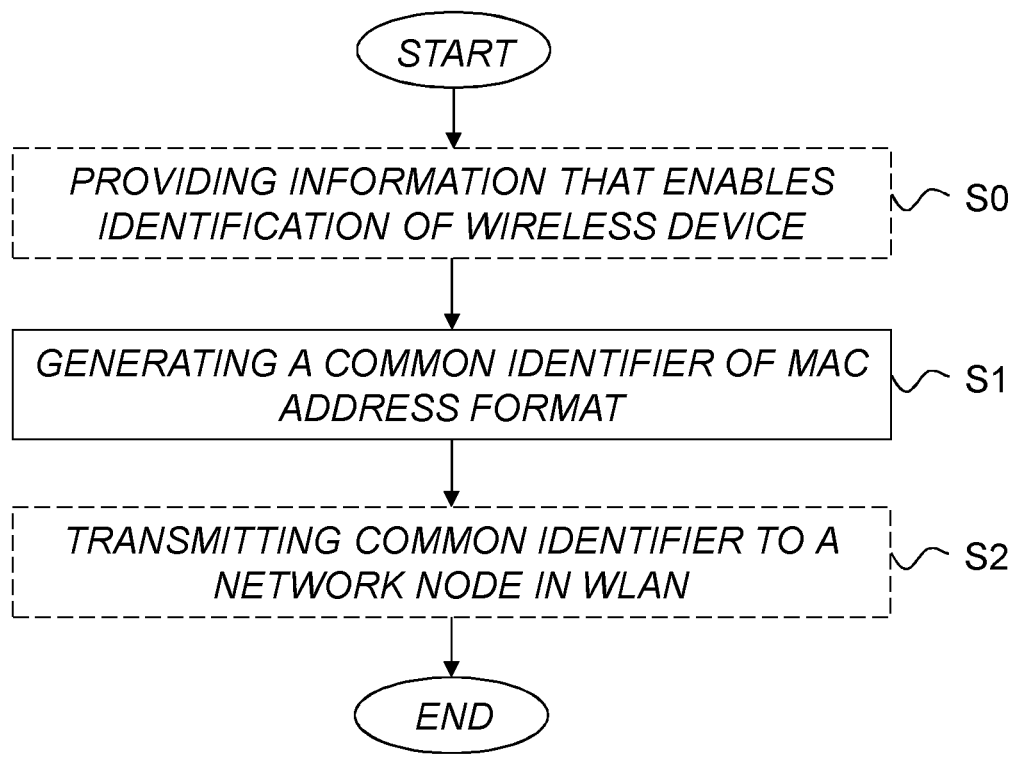
FIG. 2B is a schematic flow diagram illustrating another example of a method of generating an identifier for a wireless device in a wireless communication environment according to an alternative embodiment.

Reference can be made to the schematic flow diagram of FIG. 2B.

By way of example, the information related to the cellular radio communication network for access selection and/or mobility decision is context information such as a UE context of the wireless device in the cellular radio communication network.

By way of example, context information includes information related to a wireless device for establishing and/or maintaining communication in a wireless communication network. A cellular context of the wireless device includes information for maintaining communication in a cellular radio communication network. A WLAN context of the wireless device includes information for maintaining communication in a WLAN. Context information may for example include state information, security information and/or capability information for a wireless device, and optionally also radio access related information for the wireless device.

In particular, a UE context is a block of information related to UE that includes information useful to maintain communication and/or service in the relevant network, for example UE state information, security information and UE capability information.

In an optional embodiment, the network node of the WLAN is an access point or an access controller.

For example, the method may be performed by the wireless device or a network node serving and/or controlling the wireless device in the cellular radio communication network.

As an example, the network node may be a radio base station or a network controller.

According to a second aspect, there is provided a method for identifying a wireless device in a wireless communication environment, wherein said method comprises the steps of:

receiving S11 an identifier of Medium Access Control, MAC, address format from the wireless device communicating with a Wireless Local Area Network, WLAN, wherein the identifier of MAC address format enables identification of the wireless device in the WLAN, and the identifier also represents information that enables identification of the wireless device in a cellular radio communication network;

identifying S12 the wireless device in the WLAN based on the identifier; and identifying S13 the wireless device in the cellular radio communication network based on the identifier.

Figure 3:
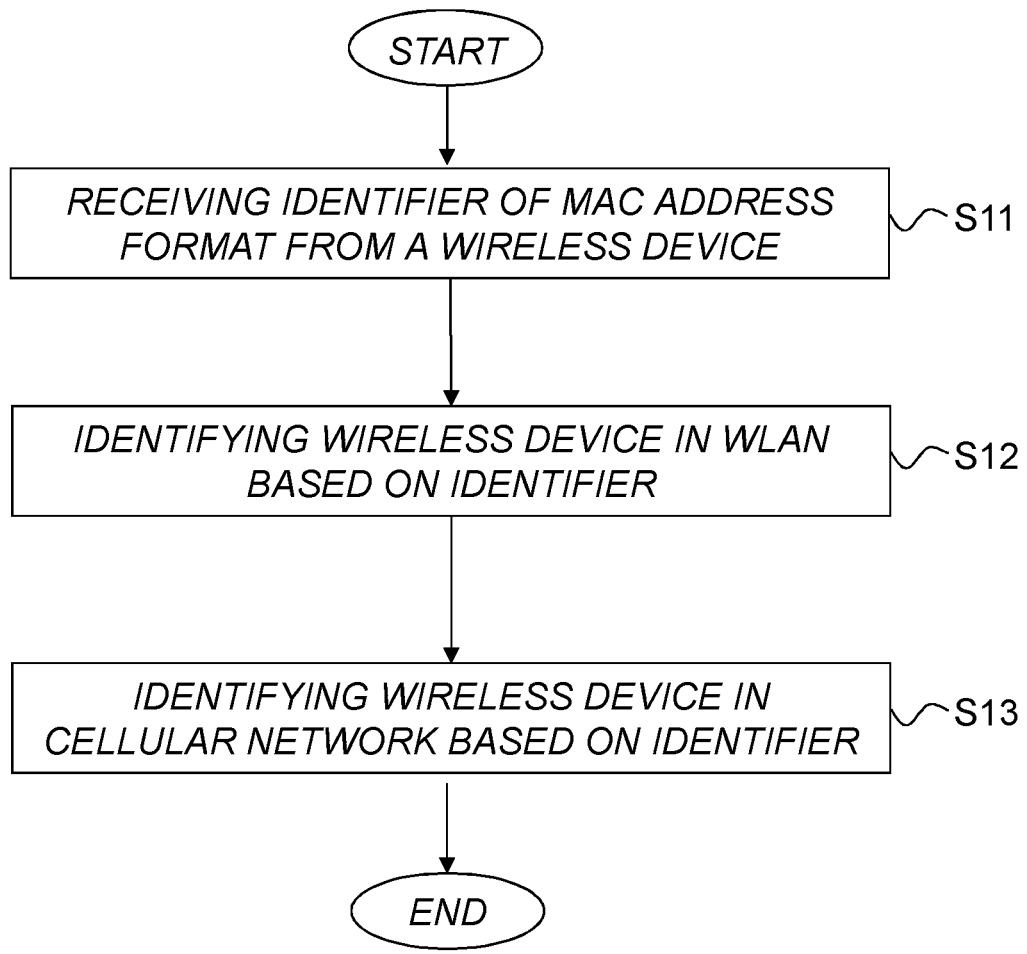
FIG. 3 is a schematic flow diagram illustrating an example of a method for identifying a wireless device in a wireless communication environment according to an embodiment.

Reference can be made to the schematic diagram of FIG. 3 illustrating an example of a method for identifying a wireless device in a wireless communication environment according to an embodiment.

By way of example, if the identifier is located in the MAC address field in one or more messages received by the WLAN, information that enables identification of the wireless device in the cellular radio communication network can be conveyed directly or at least very early in the communication sequence with the WLAN. For example, the identifier can be received in the probe request and/or association request messages in the MAC address field. As an example, the identifier could be used as the MAC address in the WLAN world since it is of MAC address format, and at the same time be used to enable identification of the wireless device in the cellular world.

For example, this will allow a network node in the WLAN to make a correlation of identities in the WLAN and the cellular network, and assist in the exchange of information for access selection, mobility decision, and/or traffic steering for the wireless device.

There is also provided an apparatus configured to identify a wireless device in a wireless communication environment, wherein said apparatus is configured to receive an identifier of Medium Access Control, MAC, address format from the wireless device communicating with a Wireless Local Area Network, WLAN, wherein the identifier of MAC address format enables identification of the wireless device in the WLAN, and the identifier also represents information that enables identification of the wireless device in a cellular radio communication network;

wherein said apparatus is configured to identify the wireless device in the WLAN based on the identifier; and wherein said apparatus is configured to identify the wireless device in the cellular radio communication network based on the identifier.

There is also provided an apparatus 300 configured to identify a wireless device in a wireless communication environment, wherein the apparatus comprises a processor 310 and a memory 320, the memory comprising instructions executable by the processor, whereby the processor is operative to:

read an identifier of Medium Access Control, MAC, address format from the wireless device communicating with a Wireless Local Area Network, WLAN, wherein the identifier of MAC address format enables identification of the wireless device in the WLAN, and the identifier also represents information that enables identification of the wireless device in a cellular radio communication network;

identify the wireless device in the WLAN based on the identifier; and identify the wireless device in the cellular radio communication network based on the identifier.

Figure 15:
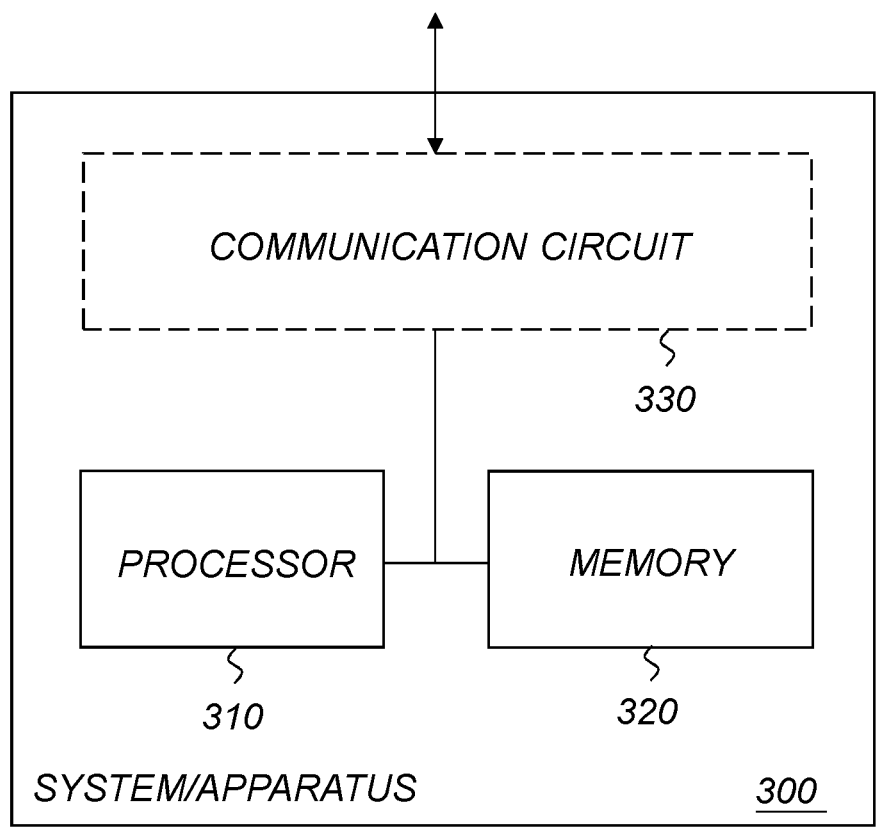
FIG. 15 is a schematic block diagram illustrating an example of a system/apparatus according to another embodiment.

Reference can be made to the schematic block diagram of FIG. 15.

There is also provided a computer program 525; 535 comprising instructions, which when executed by at least one processor, cause the at least one processor to:

read an identifier of Medium Access Control, MAC, address format from the wireless device communicating with a Wireless Local Area Network, WLAN, wherein the identifier of MAC address format enables identification of the wireless device in the WLAN, and the identifier also represents information that enables identification of the wireless device in a cellular radio communication network;

identify the wireless device in the WLAN based on the identifier; and identify the wireless device in the cellular radio communication network based on the identifier.

Reference can be made to the schematic block diagram of FIG. 17.

There is also provided an apparatus 700 for identifying a wireless device in a wireless communication environment, wherein said apparatus comprises:

a reading module 710 for reading an identifier of Medium Access Control, MAC, address format from the wireless device communicating with a Wireless Local Area Network, WLAN, wherein the identifier of MAC address format enables identification of the wireless device in the WLAN, and the identifier also represents information that enables identification of the wireless device in a cellular radio communication network; and a first identification module 720 for identifying the wireless device in the WLAN based on the identifier; and a second identification module 730 for identifying the wireless device in the cellular radio communication network based on the identifier.

Figure 19:
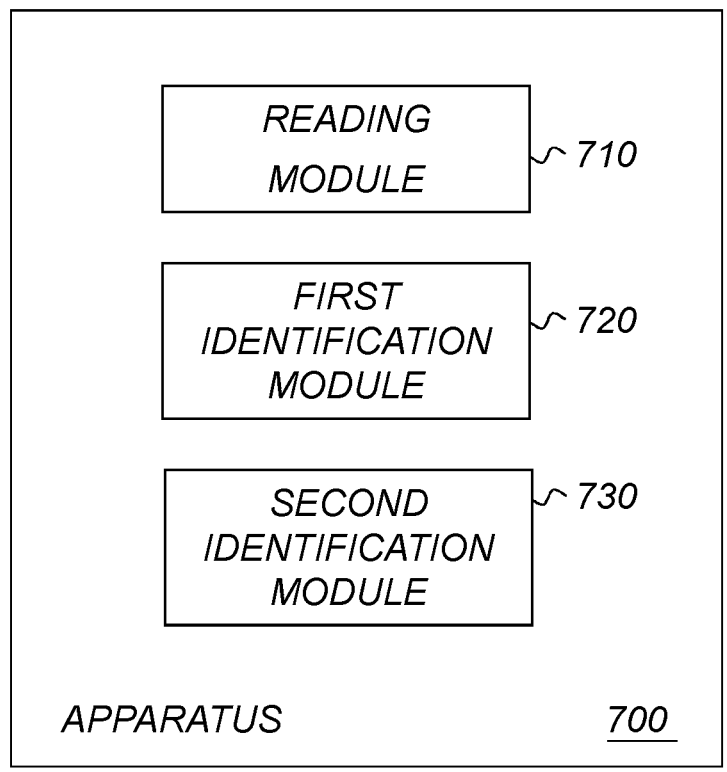
FIG. 19 is a schematic block diagram illustrating an example of an apparatus according to an embodiment.

Reference can be made to the schematic block diagram of FIG. 19.

There is also provided a network node 400 comprising an apparatus as defined above.

Figure 16:
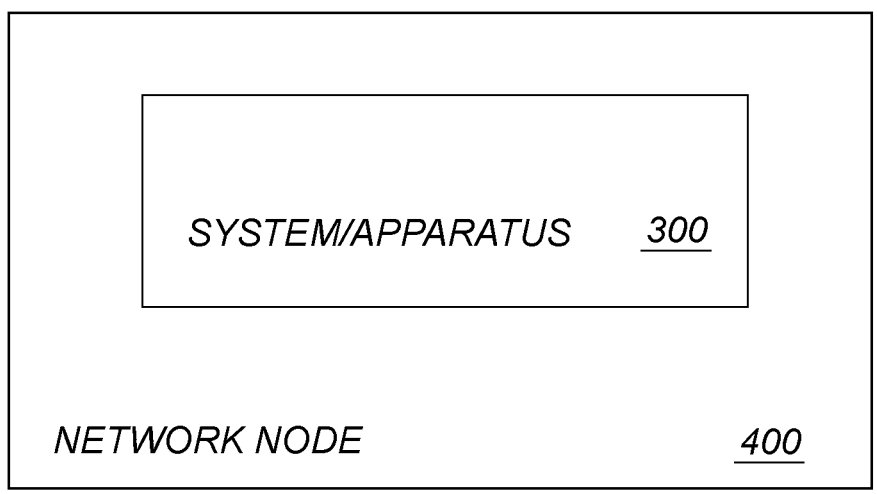
FIG. 16 is a schematic block diagram illustrating an example of a network node comprising a system/apparatus according to an embodiment.

Reference can be made to the schematic block diagram of FIG. 16.

By way of example, the method is performed by a network node in the WLAN.

For example, the network node may be a WLAN access point or a WLAN access controller.

In an optional embodiment, the WLAN network is a Wi-Fi network.

In an optional embodiment, the cellular radio communication network is a communication network operating according to a 3rd Generation Partnership Project, 3GPP, standard.

In an optional embodiment, the cellular radio communication network is a 3rd Generation Partnership Project, 3GPP, network, and the information that enables identification of the wireless device in a cellular radio communication network is 3GPP information enabling identification of the wireless device in the 3GPP network.

In an optional embodiment, the cellular radio communication network is one of the following: a GSM, GPRS, EDGE, UMTS, HSPA, HSPA+, LTE, LTE-Advanced, and IMT-advanced compliant network.

In an optional embodiment, the identifier of MAC address format is generated based on information that enables identification of the wireless device in a cellular radio communication network.

By way of example, the information that enables identification of the wireless device in a cellular radio communication network is representative of the identity of the wireless device in the cellular radio communication network.

As an example, the information that enables identification of the wireless device in a cellular radio communication network is representative of the identity of the wireless device on the radio access network level In a particular example, the information that enables identification of the wireless device in a cellular radio communication network is representative of the Cell Radio Network Temporary Identifier, C-RNTI.

In another example, the information that enables identification of the wireless device in a cellular radio communication network is representative of the identity of the wireless device on the mobility management level.

For example, the information that enables identification of the wireless device in a cellular radio communication network is representative of a Mobility Management Entity, MME, identifier and a MME-Temporary Mobile Subscriber Identity, M-TMSI.

In another example, the information that enables identification of the wireless device in a cellular radio communication network is representative of at least part of a 3GPP Global Unique Temporary Identifier, GUTI.

In an optional embodiment, the identifier of MAC address format is generated also based on a cell identity of a serving cell of the wireless device in the cellular radio communication network.

According to a third aspect, there is provided a method for assisting in the exchange of information between at least two different types of networks including a Wireless Local Area Network, WLAN, and a cellular radio communication network, wherein said method comprises the steps of:

receiving S21 an identifier of Medium Access Control, MAC, address format from the wireless device communicating with the WLAN, wherein the identifier of MAC address format enables identification of the wireless device in the WLAN, and the identifier also represents information that enables identification of the wireless device in the cellular radio communication network; and assisting S22, based on the identifier of MAC address format, in the exchange of information for the wireless device between the WLAN and the cellular radio communication network.

Figure 4:
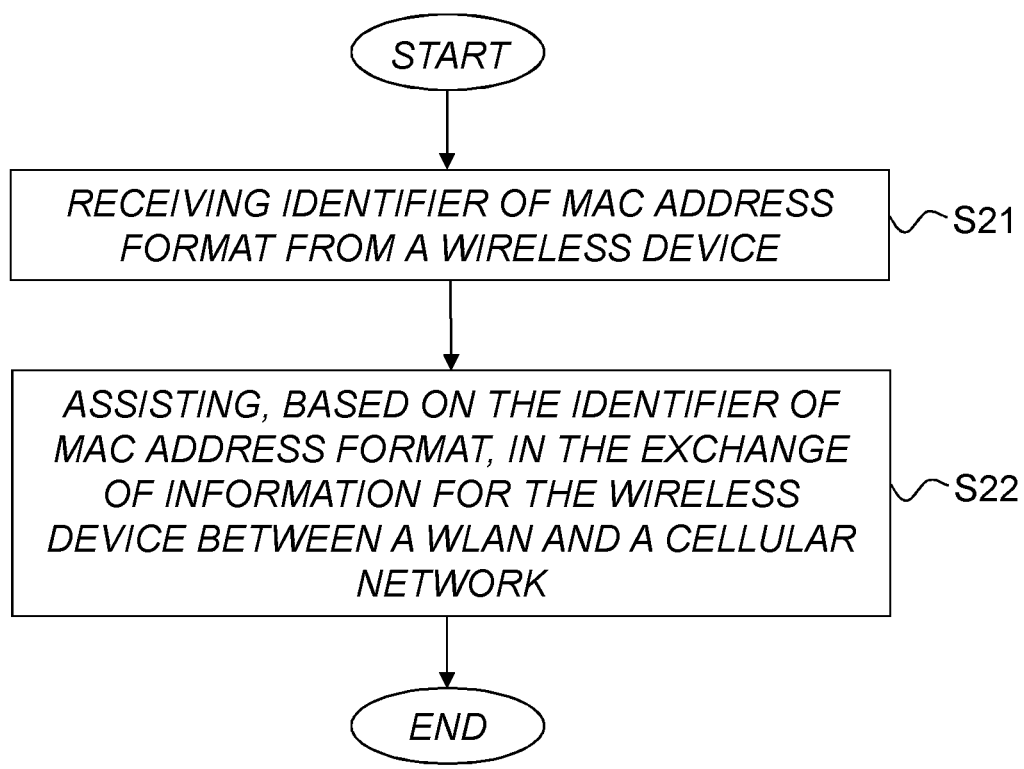
FIG. 4 is a schematic flow diagram illustrating an example of a method for assisting in the exchange of information between at least two different types of networks according to an embodiment.

Reference can be made to the schematic diagram of FIG. 4 illustrating an example of a method for assisting in the exchange of information between at least two different types of networks according to an embodiment.

In a particular embodiment, a network node of the cellular radio communication network may be contacted for exchange of information related to the wireless device between the WLAN and the cellular radio communication network. This enables coordination of information related to the wireless device between the different types of networks.

By way of example, the method may be performed by a network node in the WLAN.

For example, the network node may be a WLAN access point or a WLAN access controller.

For example, information valid for the wireless device in the cellular radio communication network may be requested from the cellular radio communication network. Alternatively, information valid for the identified wireless device in the WLAN may be transferred to the cellular radio communication network. Further processing and/or action such as access selection, mobility decision, traffic steering and/or access point association may then be performed in a suitable network node in the WLAN and/or the cellular network.

By way of example, if the identifier is located in the MAC address field in one or more messages received by the WLAN, information that enables identification of the wireless device in the cellular radio communication network can be conveyed directly or at least very early in the communication sequence with the WLAN. For example, the identifier can be received in the probe request and/or association request messages in the MAC address field. As an example, the identifier could be used as the MAC address in the WLAN world since it is of MAC address format, and at the same time be used to enable identification of the wireless device in the cellular world.

For example, this will allow a network node in the WLAN to make a correlation of identities in the WLAN and the cellular network, and assist in the exchange of information for access selection, mobility decision, traffic steering and/or access point association for the wireless device.

As an example, with information enabling identification of the wireless device in the cellular radio communication network available early in the communication sequence with the WLAN, it would be possible to take a decision on access point association and/or traffic steering, coordinated with the cellular network, prior to the authentication procedure(s). For example, this would reduce the load on AAA servers for wireless devices that anyway may be rejected.

There is also provided an apparatus configured to assist in the exchange of information between at least two different types of networks including a Wireless Local Area Network, WLAN, and a cellular radio communication network, wherein said apparatus is configured to receive an identifier of Medium Access Control, MAC, address format from a wireless device communicating with the WLAN, wherein the identifier of MAC address format enables identification of the wireless device in the WLAN, and the identifier also represents information that enables identification of the wireless device in the cellular radio communication network; and wherein said apparatus is configured to assist, based on the identifier of MAC address format, in the exchange of information for the wireless device between the WLAN and the cellular radio communication network.

By way of example, the apparatus may be configured to contact a network node of the cellular radio communication network for exchange of information related to the wireless device between the WLAN and the cellular radio communication network. This enables coordination of information related to the wireless device between the different types of networks.

There is also provided an apparatus 300 configured to assist in the exchange of information between at least two different types of networks including a Wireless Local Area Network, WLAN, and a cellular radio communication network, wherein the apparatus comprises a processor 310 and a memory 320, the memory comprising instructions executable by the processor, whereby the processor is operative to:
   read an identifier of Medium Access Control, MAC, address format from a wireless device communicating with the WLAN, wherein the identifier of MAC address format enables identification of the wireless device in the WLAN, and the identifier also represents information that enables identification of the wireless device in the cellular radio communication network; and
   assist, based on the identifier of MAC address format, in the exchange of information for the wireless device between the WLAN and the cellular radio communication network.

Reference can be made to the schematic block diagram of FIG. 15.

By way of example, the processor may be operative to assist in contacting a network node of the cellular radio communication network for exchange of information related to the wireless device between the WLAN and the cellular radio communication network. This enables coordination of information related to the wireless device between the different types of networks.

There is also provided a computer program 525; 535 comprising instructions, which when executed by at least one processor, cause the at least one processor to:
   read an identifier of Medium Access Control, MAC, address format from a wireless device communicating with a Wireless Local Area Network, WLAN, wherein the identifier of MAC address format enables identification of the wireless device in the WLAN, and the identifier also represents information that enables identification of the wireless device in a cellular radio communication network; and
   assisting, based on the identifier of MAC address format, in the exchange of information for the wireless device between the WLAN and the cellular radio communication network.

Reference can be made to the schematic block diagram of FIG. 17.

By way of example, the processor may be caused to assist in contacting a network node of the cellular radio communication network for exchange of information related to the wireless device between the WLAN and the cellular radio communication network. This enables coordination of information related to the wireless device between the different types of networks.

There is also provided an apparatus 800 for assisting in the exchange of information between at least two different types of networks including a Wireless Local Area Network, WLAN, and a cellular radio communication network, wherein said apparatus comprises:
   a reading module 810 for reading an identifier of Medium Access Control, MAC, address format from a wireless device communicating with the WLAN, wherein the identifier of MAC address format enables identification of the wireless device in the WLAN, and the identifier also represents information that enables identification of the wireless device in the cellular radio communication network; and
   an assisting module 820 for assisting, based on the identifier of MAC address format, in the exchange of information for the wireless device between the WLAN and the cellular radio communication network.

Figure 20:
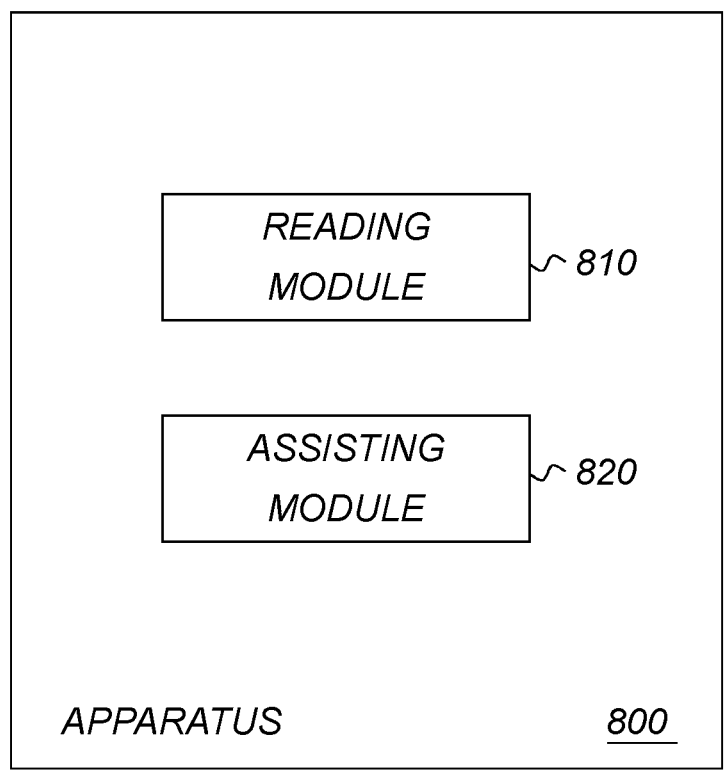
FIG. 20 is a schematic block diagram illustrating an example of an apparatus according to an embodiment.

Reference can be made to the schematic block diagram of FIG. 20.

By way of example, the assisting module may be operative for assisting in contacting a network node of the cellular radio communication network for exchange of information related to the wireless device between the WLAN and the cellular radio communication network. This enables coordination of information related to the wireless device between the different types of networks.

There is also provided a network node 400 comprising an apparatus as defined above.

Reference can be made to the schematic block diagram of FIG. 16.

By way of example, the information may be related to or used for access selection, mobility, traffic steering and/or access point association. For example, the information may be context information related to the wireless device, radio-access related information, or information related to resources, load, and other conditions for the wireless device in the WLAN and/or the cellular network.

For example, context information includes information related to a wireless device for establishing and/or maintaining communication in a wireless communication network. A cellular context of the wireless device includes information for maintaining communication in a cellular radio communication network. A WLAN context of the wireless device includes information for maintaining communication in a WLAN. Context information may for example include state information, security information and/or capability information for a wireless device, and optionally also radio access related information for the wireless device.

In an optional embodiment, the information of the wireless device is a UE context. For example, the information such as context information related to the wireless device and/or radio access related information may be requested from a network node of the cellular radio communication network.

As an example, the information such as context information related to the wireless device and/or radio access related information is requested from a base station or a mobility management unit.

In an optional embodiment, an identity of the wireless device is retrieved, based on the identifier of MAC address format, from a database associating identifiers of MAC address format and identities of wireless devices, and context information related to the wireless device and/or radio access related information of the wireless device is requested from a base station based on the retrieved identity of the wireless device.

In another optional embodiment, an identity of a base station is retrieved from a mobility management unit based on the identifier of MAC address format, and context information related to the wireless device and/or radio access related information of the wireless device is requested from the base station corresponding to the retrieved base station identity.

In an optional embodiment, the WLAN network is a Wi-Fi network.

In an optional embodiment, the cellular radio communication network is a communication network operating according to a 3rd Generation Partnership Project, 3GPP, standard In an optional embodiment, the cellular radio communication network is a 3rd Generation Partnership Project, 3GPP, network, and the information that enables identification of the wireless device in a cellular radio communication network is 3GPP information enabling identification of the wireless device in the 3GPP network.

In an optional embodiment, the cellular radio communication network is one of the following: a GSM, GPRS, EDGE, UMTS, HSPA, HSPA+, LTE, LTE-Advanced, and IMT-advanced compliant network.

In an optional embodiment, the identifier of MAC address format may be generated based on information that enables identification of the wireless device in a cellular radio communication network.

By way of example, the information that enables identification of the wireless device in a cellular radio communication network is representative of the identity of the wireless device in the cellular radio communication network.

As an example, the information that enables identification of the wireless device in a cellular radio communication network is representative of the identity of the wireless device on the radio access network level In a particular example, the information that enables identification of the wireless device in a cellular radio communication network is representative of the Cell Radio Network Temporary Identifier, C-RNTI.

In another example, the information that enables identification of the wireless device in a cellular radio communication network is representative of the identity of the wireless device on the mobility management level.

For example, the information that enables identification of the wireless device in a cellular radio communication network is representative of a Mobility Management Entity, MME, identifier and a MME-Temporary Mobile Subscriber Identity, M-TMSI.

In a particular example, the information that enables identification of the wireless device in a cellular radio communication network is representative of at least part of a 3GPP Global Unique Temporary Identifier, GUTI.

In an optional embodiment, the identifier of MAC address format is generated also based on a cell identity of a serving cell of the wireless device in the cellular radio communication network.

According to a fourth aspect, there is provided a method for linking context information of a wireless device between different types of wireless networks, wherein said method comprises the steps of:

receiving S31 an identifier of Medium Access Control, MAC, address format from the wireless device communicating within a Wireless Local Area Network, WLAN, wherein the identifier of MAC address format enables identification of the wireless device in the WLAN, and the identifier also represents information that enables identification of the wireless device in a cellular radio communication network;

requesting S32, based on the identifier of MAC address format, context information of the wireless device valid in the cellular radio communication network;

receiving S33 the requested context information of the wireless device valid in the cellular radio communication network; and linking S34 the received context information of the wireless device valid in the cellular radio communication network with context information of the wireless device valid in the WLAN.

Figure 5:
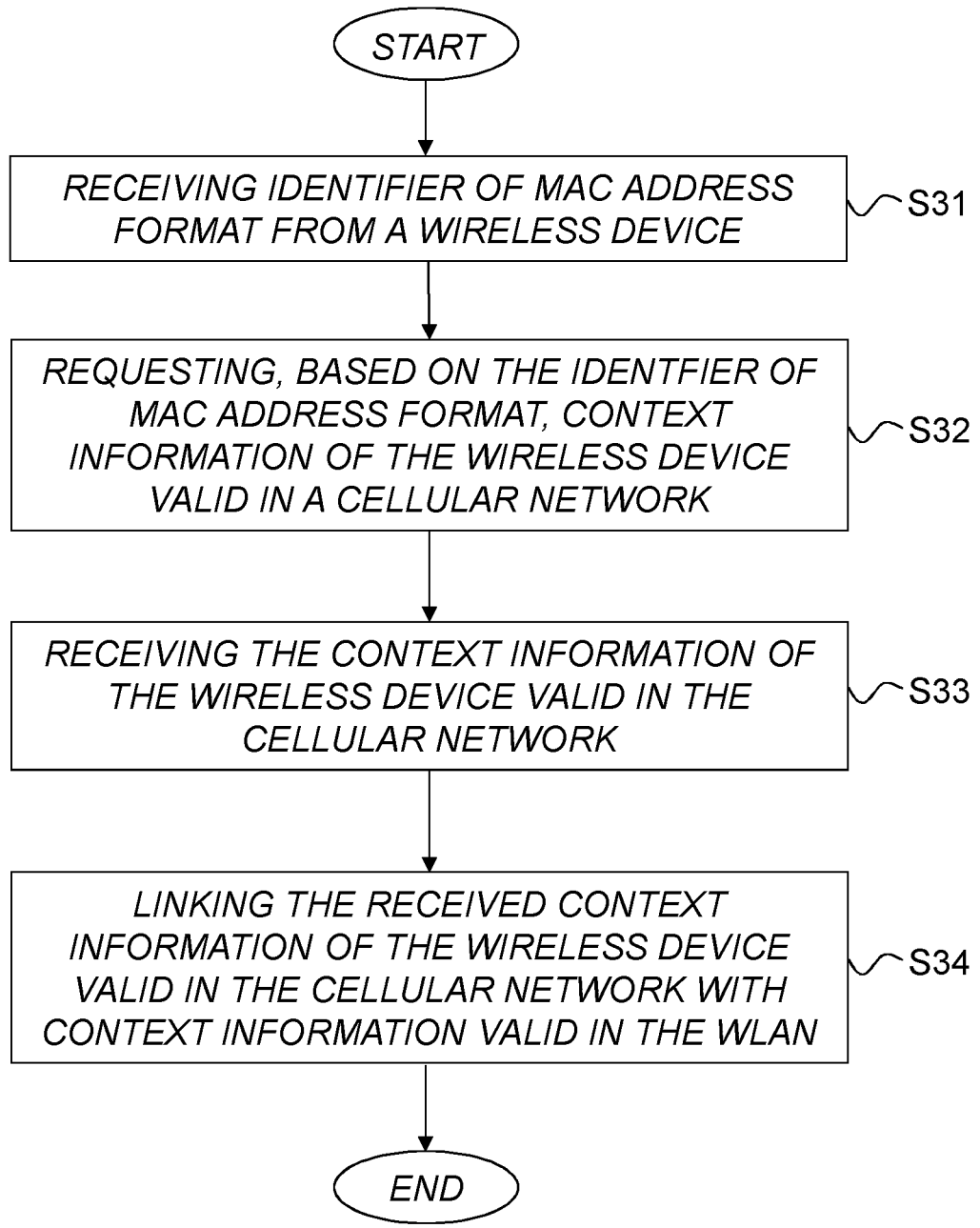
FIG. 5 is a schematic flow diagram illustrating an example of a method for linking context information of a wireless device between different types of wireless networks according to an embodiment.

Reference can be made to the schematic diagram of FIG. 5 illustrating an example of a method for linking context information of a wireless device between different types of wireless networks according to an embodiment.

By way of example, if the identifier is located in the MAC address field in one or more messages received by the WLAN, information that enables identification of the wireless device in the cellular radio communication network can be conveyed directly or at least very early in the communication sequence with the WLAN. For example, the identifier can be received in the probe request and/or association request messages in the MAC address field. As an example, the identifier could be used as the MAC address in the WLAN world since it is of MAC address format, and at the same time be used to enable identification of the wireless device in the cellular world.

There is also provided an apparatus configured to link context information of a wireless device between different types of wireless networks, wherein said apparatus is configured to receive an identifier of Medium Access Control, MAC, address format from the wireless device communicating within a Wireless Local Area Network, WLAN, wherein the identifier of MAC address format enables identification of the wireless device in the WLAN, and the identifier also represents information that enables identification of the wireless device in a cellular radio communication network;

wherein said apparatus is configured to request, based on the identifier of MAC address format, context information of the wireless device valid in the cellular radio communication network;

wherein said apparatus is configured to receive the requested context information of the wireless device valid in the cellular radio communication network; and wherein said apparatus is configured to link the received context information of the wireless device valid in the cellular radio communication network with context information of the wireless device valid in the WLAN.

There is also provided an apparatus 300 configured to link context information of a wireless device between different types of wireless networks, wherein the apparatus comprises a processor 310 and a memory 320, the memory comprising instructions executable by the processor, whereby the processor is operative to:

read an identifier of Medium Access Control, MAC, address format from the wireless device communicating within a Wireless Local Area Network, WLAN, wherein the identifier of MAC address format enables identification of the wireless device in the WLAN, and the identifier also represents information that enables identification of the wireless device in a cellular radio communication network;

trigger a request, based on the identifier of MAC address format, for context information of the wireless device valid in the cellular radio communication network;

read the requested context information of the wireless device valid in the cellular radio communication network; and link the context information of the wireless device valid in the cellular radio communication network with context information of the wireless device valid in the WLAN.

Reference can be made to the schematic block diagram of FIG. 15.

There is also provided a computer program 525; 535 comprising instructions, which when executed by at least one processor, cause the at least one processor to:

read an identifier of Medium Access Control, MAC, address format from the wireless device communicating within a Wireless Local Area Network, WLAN, wherein the identifier of MAC address format enables identification of the wireless device in the WLAN, and the identifier also represents information that enables identification of the wireless device in a cellular radio communication network;

trigger a request, based on the identifier of MAC address format, for context information of the wireless device valid in the cellular radio communication network;
read the requested context information of the wireless device valid in the cellular radio communication network; and
link the context information of the wireless device valid in the cellular radio communication network with context information of the wireless device valid in the WLAN.

Reference can be made to the schematic block diagram of FIG. 17.

There is also provided an apparatus 900 for linking context information of a wireless device between different types of wireless networks, wherein said apparatus comprises:
a reading module 910 for reading an identifier of Medium Access Control, MAC, address format from the wireless device communicating within a Wireless Local Area Network, WLAN, wherein the identifier of MAC address format enables identification of the wireless device in the WLAN, and the identifier also represents information that enables identification of the wireless device in a cellular radio communication network;
a trigger module 920 for triggering a request, based on the identifier of MAC address format, for context information of the wireless device valid in the cellular radio communication network;
a reading module 930 for reading the requested context information of the wireless device valid in the cellular radio communication network; and
a linking module 940 for linking the context information of the wireless device valid in the cellular radio communication network with context information of the wireless device valid in the WLAN.

Figure 21:
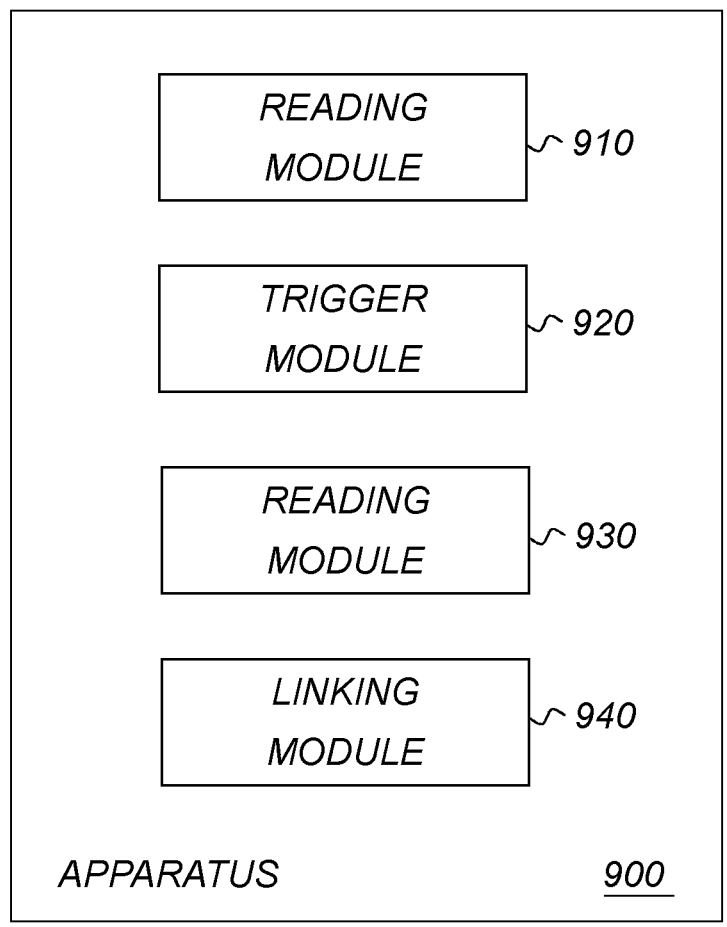
FIG. 21 is a schematic block diagram illustrating an example of an apparatus according to an embodiment.

Reference can be made to the schematic block diagram of FIG. 21.

There is also provided a network node 400 comprising an apparatus as defined above.

Reference can be made to the schematic block diagram of FIG. 16.

By way of example, context information includes information related to a wireless device for establishing and/or maintaining communication in a wireless communication network. A cellular context of the wireless device includes information for maintaining communication in a cellular radio communication network. A WLAN context of the wireless device includes information for maintaining communication in a WLAN. Context information may for example include state information, security information and/or capability information for a wireless device, and optionally also radio access related information for the wireless device.

By way of example, the method may be performed by a network node in the WLAN.

In an optional embodiment, the network node in the WLAN has access to context information of the wireless device valid in the WLAN.

For example, the network node may be a WLAN access point or a WLAN access controller.

In an optional embodiment, the context information is requested from a network node of the cellular radio communication network By way of example, context information may be requested from a base station or a mobility management unit.

In an optional embodiment, an identity of the wireless device is retrieved, based on the identifier of MAC address format, from a database associating identifiers of MAC address format and identities of wireless devices, and context information of the wireless device is requested from a base station based on the retrieved identity of the wireless device.

In another optional embodiment, an identity of a base station is retrieved from a mobility management unit based on the identifier of MAC address format, and context information of the wireless device is requested from the base station corresponding to the retrieved base station identity.

Figure 7:
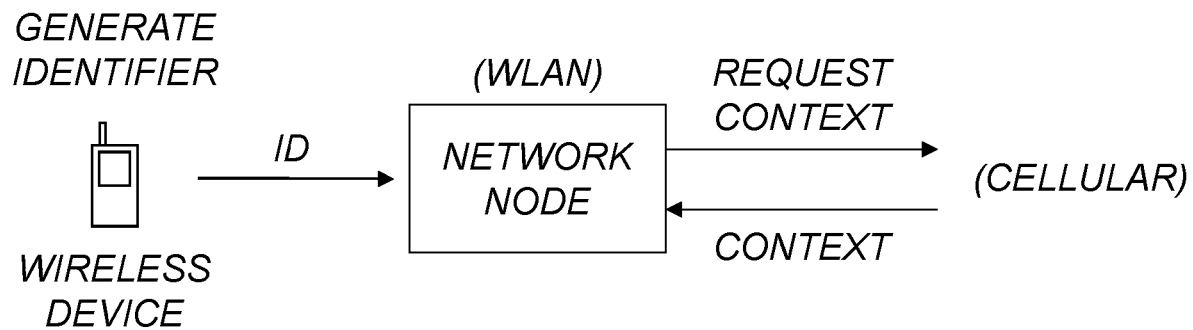
FIGS. 7-9 are schematic diagrams illustrating different examples of actions and/or signaling in connection with the request for context information of a wireless device.
Figure 8:
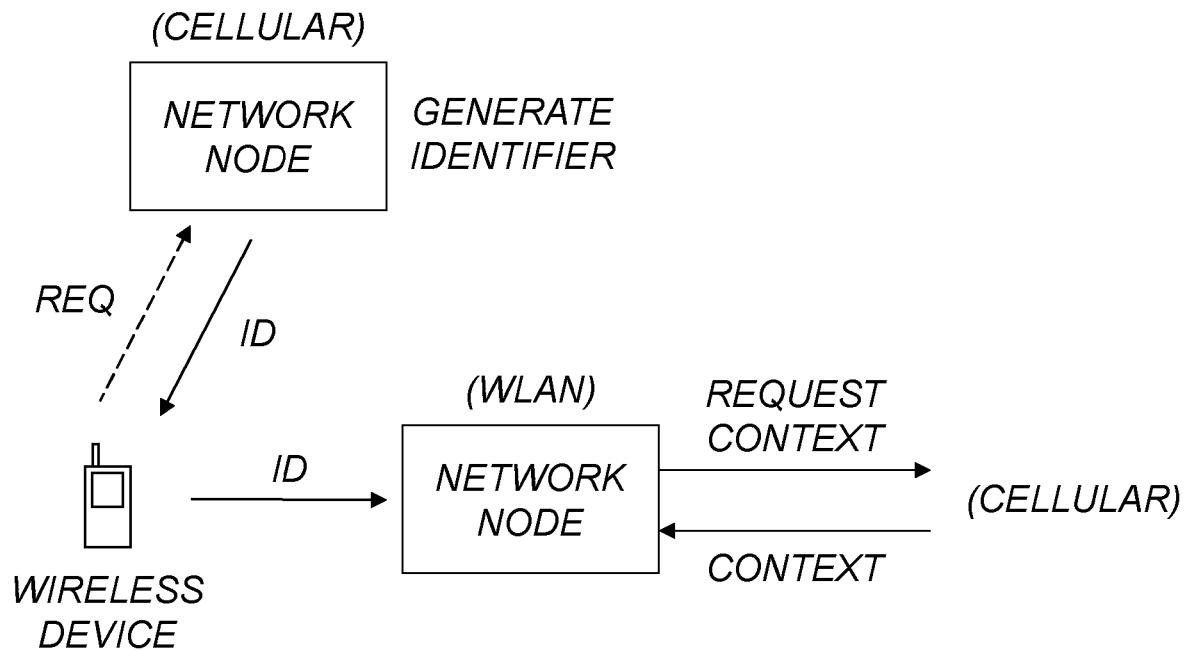
Figure 9:
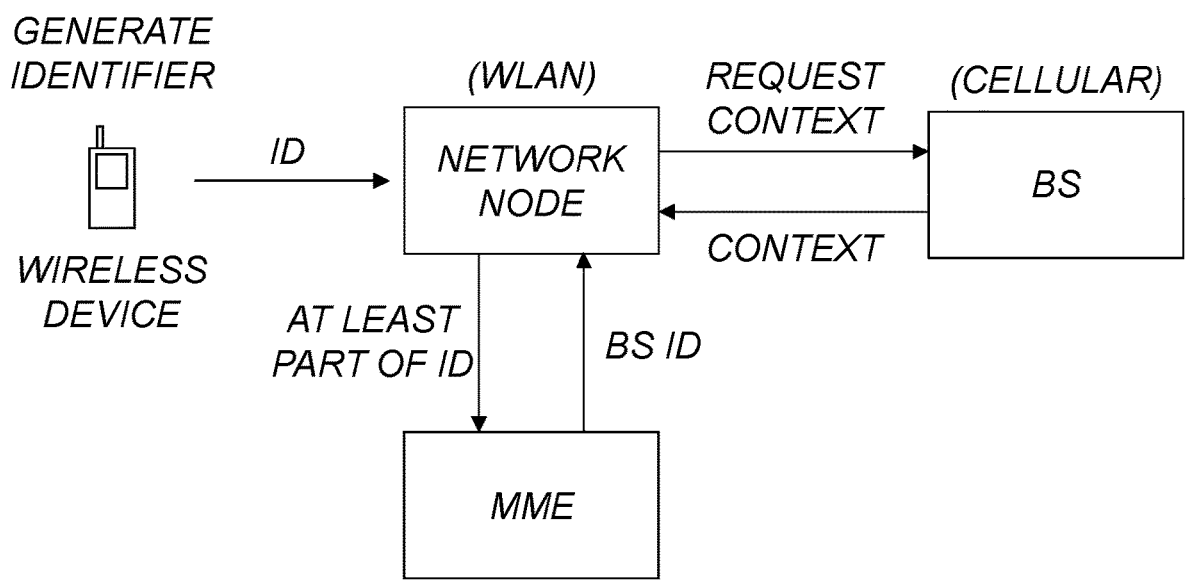

Reference can be made to the schematic diagrams of FIGS. 7-9 illustrating different examples of actions and/or signaling in connection with the request for context information of the wireless device, as described herein.

FIG. 7 and FIG. 8 illustrate, from the perspective of the network node, an example of the steps of receiving the identifier, ID, requesting context and receiving context to enable context linking.

In the particular example of FIG. 7, the wireless device is responsible for generating the identifier, ID. In the example of FIG. 8, a network node serving and/or controlling the wireless device is responsible for generating the identifier, ID. This may for example be performed upon request by the wireless device.

FIG. 9 also illustrates, from the perspective of the network node, an example of the steps of receiving the identifier, ID, requesting context and receiving context to enable context linking. In this particular example, the identity of a base station is retrieved from a mobility management unit, MME, based on at least part of the identifier, ID, and so that context information can be requested from the base station corresponding to the retrieved base station identity BS ID.

In an optional embodiment, the WLAN network is a Wi-Fi network.

In an optional embodiment, the cellular radio communication network is a communication network operating according to a 3rd Generation Partnership Project, 3GPP, standard In an optional embodiment, the cellular radio communication network is a 3rd Generation Partnership Project, 3GPP, network, and the information that enables identification of the wireless device in a cellular radio communication network is 3GPP information enabling identification of the wireless device in the 3GPP network.

In an optional embodiment, the cellular radio communication network is one of the following: a GSM, GPRS, EDGE, UMTS, HSPA, HSPA+, LTE, LTE-Advanced, and IMT-advanced compliant network.

In an optional embodiment, the identifier of MAC address format may be generated based on information that enables identification of the wireless device in a cellular radio communication network.

By way of example, the information that enables identification of the wireless device in a cellular radio communication network is representative of the identity of the wireless device in the cellular radio communication network.

As an example, the information that enables identification of the wireless device in a cellular radio communication network is representative of the identity of the wireless device on the radio access network level In a particular example, the information that enables identification of the wireless device in a cellular radio communication network is representative of the Cell Radio Network Temporary Identifier, C-RNTI.

As another example, the information that enables identification of the wireless device in a cellular radio communication network is representative of the identity of the wireless device on the mobility management level.

For example, the information that enables identification of the wireless device in a cellular radio communication network is representative of a Mobility Management Entity, MME, identifier and a MME-Temporary Mobile Subscriber Identity, M-TMSI.

In a particular example, the information that enables identification of the wireless device in a cellular radio communication network is representative of at least part of a 3GPP Global Unique Temporary Identifier, GUTI.

In an optional embodiment, the identifier of MAC address format is generated also based on a cell identity of a serving cell of the wireless device in the cellular radio communication network.

According to a fifth aspect, there is provided a method for supporting access selection and/or mobility decision in a wireless communication environment, wherein said method comprises the steps of:
  receiving S41 an identifier of Medium Access Control, MAC, address format from a wireless device communicating within a Wireless Local Area Network, WLAN, wherein the identifier of MAC address format enables identification of the wireless device in the WLAN, and the identifier also represents information that enables identification of the wireless device in a cellular radio communication network;
  requesting S42, based on the identifier of MAC address format, context information and/or radio access related information valid for the wireless device in the cellular radio communication network; and
  receiving S43 the requested context information and/or radio access related information valid for the wireless device in the cellular radio communication network; and
  compiling S44 information for access selection and/or mobility decision based on the received context information and/or radio access related information valid for the wireless device in the cellular radio communication network and context information and/or radio access related information valid for the wireless device in the WLAN.

Figure 6:
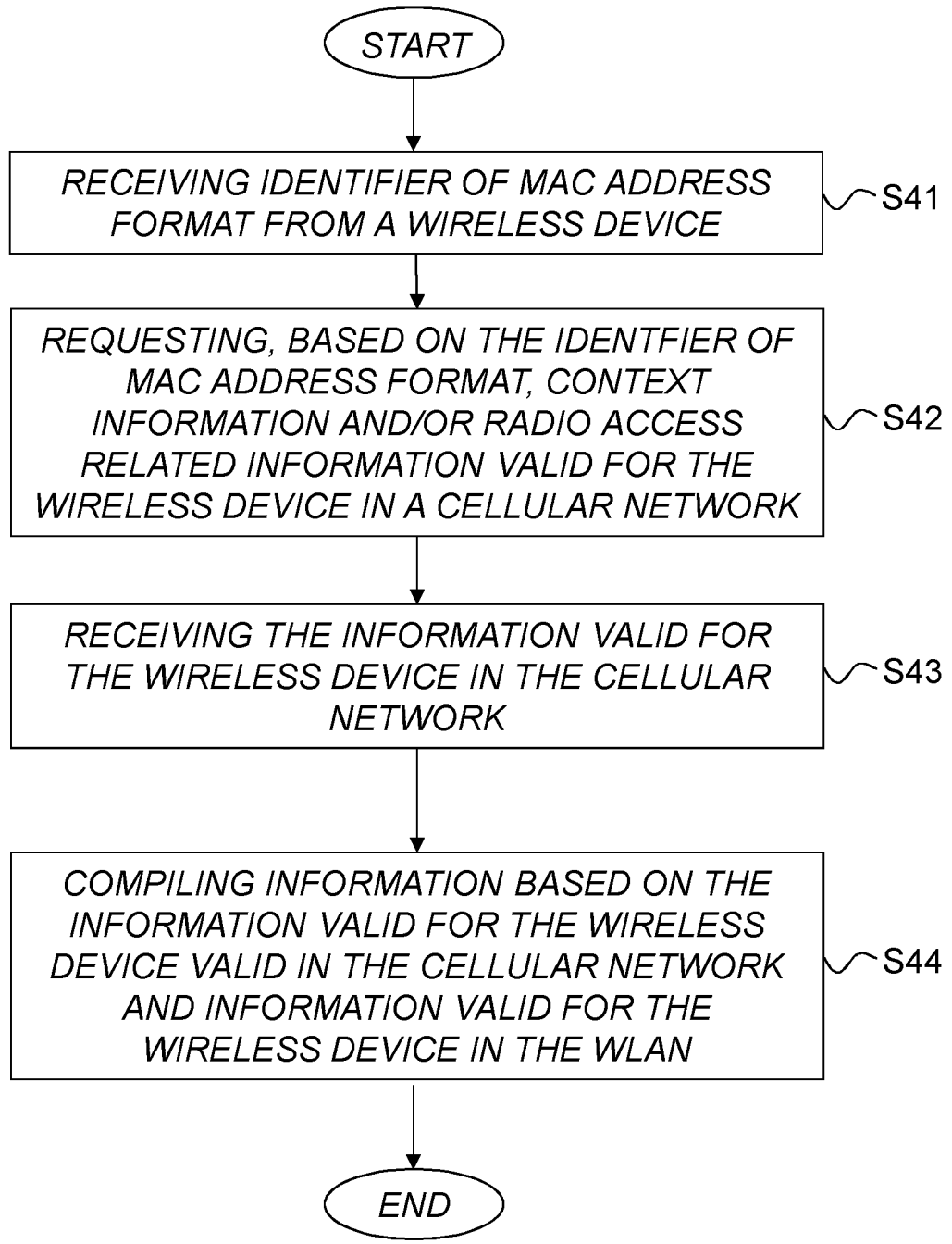
FIG. 6 is a schematic flow diagram illustrating an example of a method for supporting access selection and/or mobility decision in a wireless communication environment according to an embodiment.

Reference can be made to the schematic diagram of FIG. 6 illustrating an example of a method for supporting access selection and/or mobility decision in a wireless communication environment according to an embodiment.

By way of example, if the identifier is located in the MAC address field in one or more messages received by the WLAN, information that enables identification of the wireless device in the cellular radio communication network can be conveyed directly or at least very early in the communication sequence with the WLAN. For example, the identifier can be received in the probe request and/or association request messages in the MAC address field. As an example, the identifier could be used as the MAC address in the WLAN world since it is of MAC address format, and at the same time be used to enable identification of the wireless device in the cellular world.

There is also provided an apparatus configured to support access selection and/or mobility decision in a wireless communication environment,
  wherein said apparatus is configured to receive an identifier of Medium Access Control, MAC, address format from a wireless device communicating within a Wireless Local Area Network, WLAN, wherein the identifier of MAC address format enables identification of the wireless device in the WLAN, and the identifier also represents information that enables identification of the wireless device in a cellular radio communication network; and
  wherein said apparatus is configured to request, based on the identifier of MAC address format, context information and/or radio access related information valid for the wireless device in the cellular radio communication network;
  wherein said apparatus is configured to receive the requested context information and/or radio access related information valid for the wireless device in the cellular radio communication network; and
  wherein said apparatus is configured to compile information for access selection and/or mobility decision based on the received context information and/or radio access related information valid for the wireless device in the cellular radio communication network and context information and/or radio access related information valid for the wireless device in the WLAN.

There is also provided an apparatus 300 configured to support access selection and/or mobility decision in a wireless communication environment, wherein the apparatus comprises a processor 310 and a memory 320, the memory comprising instructions executable by the processor, whereby the processor is operative to:
  read an identifier of Medium Access Control, MAC, address format from a wireless device communicating within a Wireless Local Area Network, WLAN, wherein the identifier of MAC address format enables identification of the wireless device in the WLAN, and the identifier also represents information that enables identification of the wireless device in a cellular radio communication network;
  trigger a request, based on the identifier of MAC address format, for context information and/or radio access related information valid for the wireless device in the cellular radio communication network;
  read the requested context information and/or radio access related information valid for the wireless device in the cellular radio communication network; and
  compile information for access selection and/or mobility decision based on the received context information and/or radio access related information valid for the wireless device in the cellular radio communication network and context information and/or radio access related information valid for the wireless device in the WLAN.

Reference can be made to the schematic block diagram of FIG. 15.

There is also provided a computer program 525; 535 comprising instructions, which when executed by at least one processor, cause the at least one processor to:
  read an identifier of Medium Access Control, MAC, address format from a wireless device communicating within a Wireless Local Area Network, WLAN, wherein the identifier of MAC address format enables identification of the wireless device in the WLAN, and the identifier also represents information that enables identification of the wireless device in a cellular radio communication network;
  trigger a request, based on the identifier of MAC address format, for context information and/or radio access related information valid for the wireless device in the cellular radio communication network;

read the requested context information and/or radio access related information valid for the wireless device in the cellular radio communication network; and compile information for access selection and/or mobility decision based on the context information and/or radio access related information valid for the wireless device in the cellular radio communication network and context information and/or radio access related information valid for the wireless device in the WLAN.

Reference can be made to the schematic block diagram of FIG. 17.

There is also provided an apparatus 1000 for supporting access selection and/or mobility decision in a wireless communication environment, wherein said apparatus comprises:

a reading module 1010 for reading an identifier of Medium Access Control, MAC, address format from a wireless device communicating within a Wireless Local Area Network, WLAN, wherein the identifier of MAC address format enables identification of the wireless device in the WLAN, and the identifier also represents information that enables identification of the wireless device in a cellular radio communication network; and a trigger module 1020 for triggering a request, based on the identifier of MAC address format, for context information and/or radio access related information valid for the wireless device in the cellular radio communication network;

a reading module 1030 for reading the requested context information and/or radio access related information valid for the wireless device in the cellular radio communication network; and a compiling module 1040 for compiling information for access selection and/or mobility decision based on the context information and/or radio access related information valid for the wireless device in the cellular radio communication network and context information and/or radio access related information valid for the wireless device in the WLAN.

Figure 22:
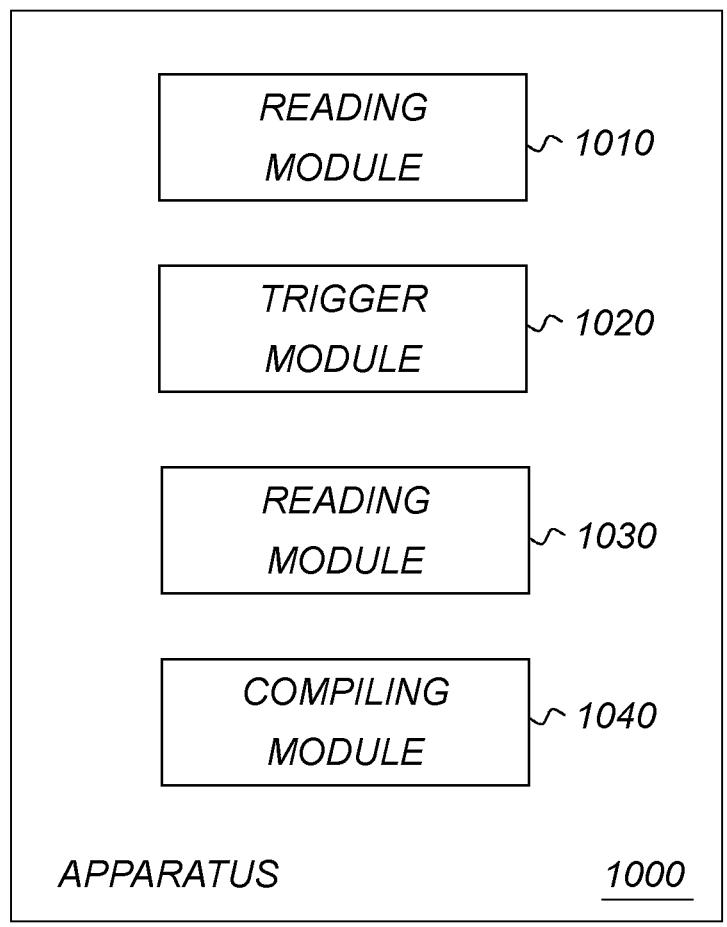
FIG. 22 is a schematic block diagram illustrating an example of an apparatus according to an embodiment.

Reference can be made to the schematic block diagram of FIG. 22.

There is also provided a network node comprising an apparatus as defined above.

Reference can be made to the schematic block diagram of FIG. 16.

By way of example, context information includes information related to a wireless device for establishing and/or maintaining communication in a wireless communication network. A cellular context of the wireless device includes information for maintaining communication in a cellular radio communication network. A WLAN context of the wireless device includes information for maintaining communication in a WLAN. Context information may for example include state information, security information and/or capability information for a wireless device, and optionally also radio access related information for the wireless device.

By way of example, the context information and/or radio access related information may be requested from a network node of the cellular radio communication network.

For example, the context information and/or radio access related information is requested from a base station or a mobility management unit.

In an optional embodiment, an identity of the wireless device is retrieved, based on the identifier of MAC address format, from a database associating identifiers of MAC address format and identities of wireless devices, and the context information and/or radio access related information of the wireless device is requested from a base station based on the retrieved identity of the wireless device.

In another optional embodiment, an identity of a base station is retrieved from a mobility management unit based on the identifier of MAC address format, and the context information and/or radio access related information of the wireless device is requested from the base station corresponding to the retrieved base station identity.

Reference can once again be made to the schematic diagrams of FIGS. 7-9 illustrating different examples of actions and/or signaling in connection with the request for context information and/or radio access related information of the wireless device.

In an optional embodiment, the WLAN network is a Wi-Fi network.

In an optional embodiment, the cellular radio communication network is a communication network operating according to a 3rd Generation Partnership Project, 3GPP, standard.

In an optional embodiment, the cellular radio communication network is a 3rd Generation Partnership Project, 3GPP, network, and the information that enables identification of the wireless device in a cellular radio communication network is 3GPP information enabling identification of the wireless device in the 3GPP network.

In an optional embodiment, the cellular radio communication network is one of the following: a GSM, GPRS, EDGE, UMTS, HSPA, HSPA+, LTE, LTE-Advanced, and IMT-advanced compliant network.

In an optional embodiment, the identifier of MAC address format may be generated based on information that enables identification of the wireless device in a cellular radio communication network.

By way of example, the information that enables identification of the wireless device in a cellular radio communication network is representative of the identity of the wireless device in the cellular radio communication network.

For example, the information that enables identification of the wireless device in a cellular radio communication network is representative of the identity of the wireless device on the radio access network level In a particular example, the information that enables identification of the wireless device in a cellular radio communication network is representative of the Cell Radio Network Temporary Identifier, C-RNTI.

As another example, the information that enables identification of the wireless device in a cellular radio communication network is representative of the identity of the wireless device on the mobility management level.

For example, the information that enables identification of the wireless device in a cellular radio communication network is representative of a Mobility Management Entity, MME, identifier and a MME-Temporary Mobile Subscriber Identity, M-TMSI.

In a particular example, the information that enables identification of the wireless device in a cellular radio communication network is representative of at least part of a 3GPP Global Unique Temporary Identifier, GUTI.

In an optional embodiment, the identifier of MAC address format is generated also based on a cell identity of a serving cell of the wireless device in the cellular radio communication network.

By way of example, the method may be performed by a network node in the WLAN.

For example, the network node may be a WLAN access point or a WLAN access controller.

The WLAN network node, such as the access point in a Wi-Fi network, may also be responsible for taking a decision on access selection, mobility, traffic steering, and/or access point association of the wireless device based on the compiled information.

Alternatively, the compiled information is transferred to a suitable network node in the cellular network, which may then take a decision on access selection, mobility, traffic steering, and/or access point association of the wireless device based on the compiled information.

A related aspect concerns applications to traffic steering in general based on information retrieved using the above identifier/identification of the wireless device.

Another relate aspect concerns association of the wireless device to a certain access point in the WLAN, so-called access point association, based on the above identifier/identification of the wireless device.

Each apparatus and/or network node and/or communication device defined herein may optionally include communication circuitry configured to perform the relevant communication including receiving and/or transmitting information. For example, with reference to FIG. 15, the system/apparatus 300 may include an optional communication circuit 330.

Each computer program defined herein may be stored on a carrier, wherein the carrier is one of an electronic signal, an optical signal, an electromagnetic signal, a magnetic signal, an electric signal, a radio signal, a microwave signal, or a computer-readable storage medium.

For a better understanding of the proposed technology, it may be useful to describe some non-limiting example embodiments. Reference can be made to the schematic example diagrams of FIGS. 10-12.

In the following, reference will be made to 3GPP networks, but it should be understood that the proposed technology is applicable to any cellular radio communication network.

In state of the art solutions for 3GPP/WLAN interworking, the common identifier used to relate the UE context in the 3GPP domain to the UE context in the WLAN domain is the IMSI. However, in order to obtain the IMSI of a UE in WLAN, the UE needs to perform an EAP-SIM/AKA/AKA' authentication, which means that the link between the UE context in 3GPP and WLAN does not exist before the initiation of the EAP authentication. Furthermore, using IMSI frequently might lead to compromised user privacy.

Figure 10:
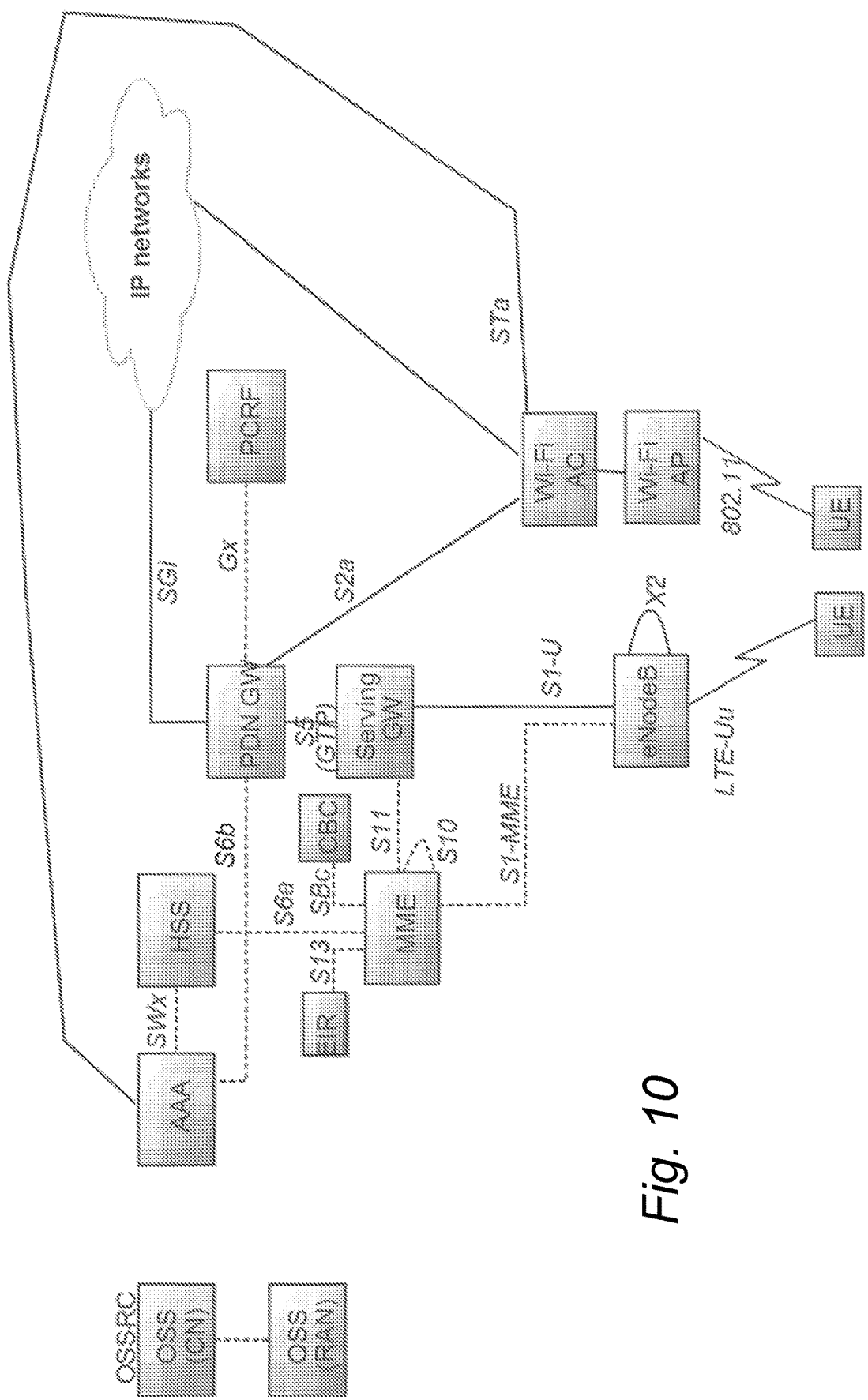
FIG. 10 is a schematic diagram illustrating an example of a network architecture of an E-UTRAN network including Wi-Fi integration.

FIG. 10 shows the network architecture for E-UTRAN and EPC and how the eNodeB is connected via the S1-interfaces, S1-MME and S1-U to the MME and Serving GW respectively. It also shows how the Wi-Fi access network is connected to the PDN-GW via the S2a interface and to the 3GPP AAA Server via the STa interface. It should be noted that the configuration of the Wi-Fi network shown in FIG. 1 is only an illustrative example and that the Wi-Fi network may be configured or arranged in several other ways and may comprise several further network nodes or entities. For example, the Wi-Fi network may also include a Broadband Network Gateway (BNG). In another example, the Wi-Fi AP may be co-located with a Residential Gateway (RG). In a further example, the Wi-Fi network may also comprise a Trusted WLAN Access Gateway (TWAG). In addition, the interface between the Wi-Fi AC and the PDN GW, i.e. the S2a interface, may also be implemented between the PDN GW and for example either the BNG or the RG.

Wi-Fi integration into Radio Access Network (RAN) is also emerging as an interesting study object. There are basically two different possible levels that could be implemented either separately or together. A first level of integration is to combine both 3GPP and Wi-Fi in the small pico base stations to gain access to the Wi-Fi sites with 3GPP technology and vice versa. The second level of integration is to integrate the Wi-Fi access tighter into the RAN by introducing enhanced network controlled traffic steering between 3GPP and Wi-Fi based on knowledge about the total situation on the different accesses.

The driver for this second level of integration is to avoid potential issues with UE controlled Wi-Fi selection such as selecting Wi-Fi when the Wi-Fi connection is bad or when the UE is moving, thus giving better end user performance and better utilization of the combined Wi-Fi and cellular radio network resources.

The current methods for integration of Wi-Fi into 3GPP network described earlier do not offer good support for network controlled Wi-Fi/3GPP access selection and service mapping taking into consideration of radio access related input parameters such as UE mobility, 3GPP/Wi-Fi cell and network load, radio link performance etc.

In order to achieve this functionality it is required to link (or connect) the UE context in the 3GPP RAN (which holds information about radio performance, UE mobility etc. on the 3GPP side) with the UE context in the Wi-Fi network. This can then enable a network entity to take decisions whether the UE should access the Wi-Fi network or not depending on if the UE is stationary, and/or has a good connection to the Wi-Fi AP and so forth. The decision can then be signaled to the UE or executed internally in the 3GPP/Wi-Fi network (e.g. to control UE admission to Wi-Fi).

Mechanisms have been introduced for allowing the UE to perform authentication towards the Wi-Fi network using (U)SIM credentials and identities (IMSI) as part of the EAP-SIM/AKA/AKA' protocol signaling. This means that there is a common identity (the IMSI) available in both 3GPP and Wi-Fi sides. The main principle for solutions based on IMSI would be that the current serving 3GPP RAN node updates a UE database with the association IMSI and serving 3GPP RAN node (partly similar to the UE Location Function described as part of the current invention). When the legacy UE attempts to access the Wi-Fi side, the Wi-Fi network contacts the UE database to retrieve information about current RAN node for the UE and IMSI is used as the main key in this query. Once the Wi-Fi side retrieves information about the RAN node, communication between the radio accesses is enabled and information on both sides can be combined to make the optimal mobility decision. As mentioned earlier the mobility decision can be taken either at the non-3GPP access side, at the current 3GPP RAN node serving the UE, or at a more central function that also collects the information needed for the mobility decision.

Figure 11:
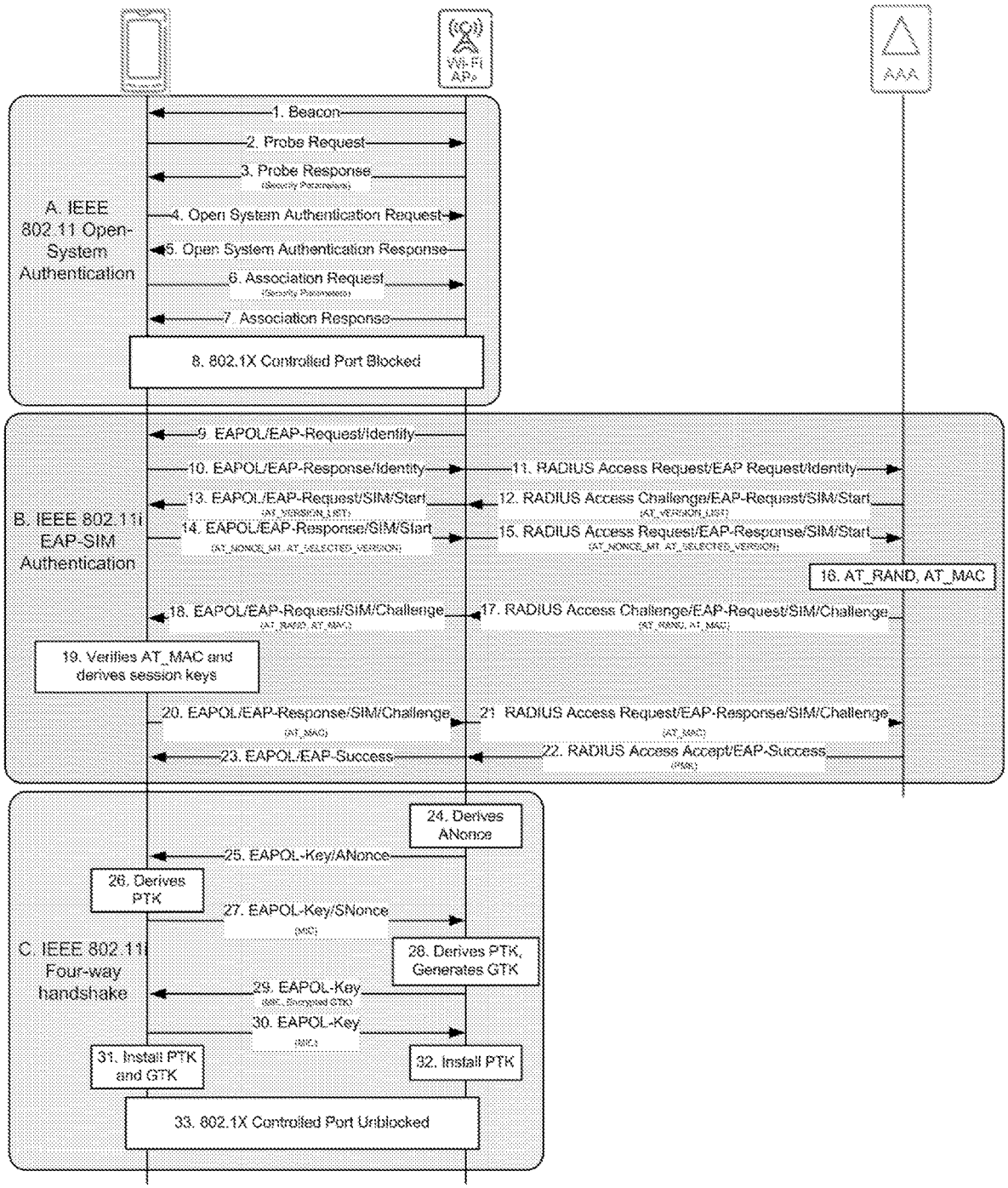
FIG. 11 is a schematic diagram illustrating an example of a WLAN connection procedure including authentication.

The WLAN connection procedure for a STA is depicted in FIG. 11.

The procedure comprises the following steps:

1 The STA receives a Beacon frame revealing (among other parameters) the security features associated with the ESS the AP belongs to. The format of the beacon frame as well as all the information elements it carries are described in Chapter 8.3.3.2 of IEEE 802.11;

2 If the STA does not receive a Beacon frame for some reason, it can generate a Probe Request and send it to the AP. This procedure is called active scanning and by performing it, the STA can receive from the AP the same information as it would have from a Beacon message. The Probe Request frame is described in Chapter 8.3.3.9 of IEEE 802.11;

3 The AP answers with Probe Response—IEEE 802.11, Chapter 8.3.3.10;

a. NOTE: The discovery procedure consists of either step 1 or steps 2 and 3 (i.e., receiving a Beacon frame and exchanging probe messages are mutually exclusive);

4 The STA sends an Open System Authentication Request as defined in Chapter 11.2.3.2 of IEEE 802.11;

5 The AP responds with an Open System Authentication Response;

6 The STA then sends an Association Request, indicating the security parameters to be used later;

7 The AP responds with an Association Response a. NOTE: The Open System Authentication does not provide any security. The connection between the STA and the AP is secured at a later point, by means of Authentication and Key Agreement procedure. Nevertheless, a possible attack altering the security parameters in the Open System Authentication message exchange will be detected at the stage of key derivation;

8 At this point the Open System Authentication is completed and the STA can communicate only with the AP—the rest of the traffic is blocked by the port-based network control (PBNC) enforcer, as defined in IEEE 802.1X. Some of the traffic towards external hosts, however, can be forwarded by the AP, as in the case of the communication with the RADIUS server;

9 This step is the first step of the EAP-SIM authentication RFC 4186. The AP encapsulates an EAP-Request of Type 18 (SIM) inside an EAPOL (EAP over LAN) frame, asking the STA to report its identity. In the case when the STA is equipped with a SIM, the identity is the IMSI, followed by the "@" sign and the home realm. It is also possible for the STA to include an additional "1" in front of the IMSI in order to indicate preference for the exclusive use of EAP-SIM if other EAP methods are available (e.g., EAP-AKAe);

10 The STA responds with its identity. An example of such is: 1234580123000100@wlan.mnc048.mcc264.3gpp-network.org (and IMSI is in this example 234580123000100 and the preceding "1" indicates the preference to use EAP-SIM);

11 The AP extracts the EAP-Response message, encapsulates it in a RADIUS frame and forwards it to the backend AAA server. The handling of EAP frames over RADIUS is described by the IETF in RFC 3579;

12 The AAA server recognizes the EAP method and sends an EAP-Request/SIM/Start, indicating that an EAP-SIM procedure has been initiated for that Supplicant. It also includes the list of supported SIM versions in the message as described in Chapter 10.2 of RFC 4186;

13 The AP relays the EAP-Request/SIM/Start message to the STA;

14 The STA responds with EAP-Response/SIM/Start message, which carries a random number (NONCE_MT) carried in the AT_NONCE_MT attribute (a randomly selected number), as well as the selected EAP-SIM version (AT_SELECTED_VERSION);

15 The AP forwards the EAP-Response/SIM/Start to the AAA server;

16 The AAA server obtains the GSM triplet (RAND, SRES and Kc) from the HLR/AuC and derives the keying material as specified in Chapter 7 of RFC 4186. The GSM triplet consists of:

a. RAND—a 128-bit random number, generated by the Authentication Center (an entity within the GSM core network, used to authenticate subscribers at the point of initial attach) when a subscriber authentication is requested. Its main use is for the derivation of the Signed Response (SRES) and the Kc;

b. SRES—a 32-bit variable, the expected response from the mobile station/STA after it has been challenged with the RAND;

c. Kc—a 64-bit ciphering key, used to encipher and decipher data transmitted between the STA and the AP;

17 The AAA generates an EAP-Request/SIM/Challenge message, including RAND challenges and message authentication code attribute (AT_MAC). The AT_MAC derivation is based on the RAND and Kc values;

18 The AP forwards the EAP-Request/SIM/Challenge message to the STA;

19 The STA feeds the received RAND into the GSM algorithms running on the SIM and the output is a copy of the AT_MAC and a SRES value. The first thing for the STA to do is to check whether the AT_MAC value received by the AAA (relayed by the AP) and the one generated by the SIM match. If so the STA continues with the authentication, otherwise it responds with an EAP-Response/SIM/Client-Error message. The second thing is to derive a new AT_MAC, based on the generated SRES;

20 The new AT_MAC is sent to the AAA server (via the AP) in an EAP-Response/SIM/Challenge message;

21 The AP forwards the EAP-Response/SIM/Challenge to the AAA server;

22 The AAA server verifies the new AT_MAC value that the STA has just sent. If the verification is successful, it sends an EAP-Success message to the AP. The message also carries keying material—Pairwise Master Key (PMK). The PMK is intended for the AP only and it is not forwarded to the STA (the STA can derive the same key autonomously since it is based on the Kc, which the SIM in the STA can compute based on the RAND);

23 The AP forwards the EAP-Success message to the STA and stores the PMK for the following Four-way handshake;

24 The AP uses the PMK to generate an Authenticator nonce (ANonce);

25 The ANonce value is sent to the STA in an EAPOL-Key message;

26 Using the received ANonce (together with the SNonce and the PMK), the STA constructs the Pairwise Temporal Key (PTK);

27 The STA sends an EAPOL-Key message to the AP, including a Supplicant nonce (SNonce) and a message integrity code (MIC);

28 The AP uses the ANonce, SNonce and the PMK to construct the PTK. The AP also uses the MIC in order to verify that the STA has computed the correct and fresh key. Furthermore, the AP also generates and installs a Group Temporal Key (GTK, which is used exclusively for the encryption and decryption of broadcast and multicast traffic;

29 The AP sends to the STA an encrypted GTK, a sequence number to use for the next broadcast message and an instruction to install the PTK (the message is integrity protected by another MIC);

30 The STA responds with an acknowledgement message;

31 The STA installs both the PTK and the GTK and as of this point uses them to encrypt and decrypt all communication;

32 The AP also installs the PTK;

33 The 802.1X Controlled Port is now open and the STA can communicate with other network hosts besides the AP.

As explained above, a mobility decision requires that both the UE context in the cellular/3GPP domain and the WLAN domain are available in order to take an optimum access selection decision. Furthermore, as discussed, the only common UE identifier in both the 3GPP and WLAN domains is the IMSI. The problem is that the IMSI is not available before the EAP authentication is initiated (i.e., step 10 above) hence the mobility decision entity needs to have the UE always perform an Open System Authentication in WLAN in order to obtain the IMSI and link the UE's context in WLAN to the one in 3GPP. This approach leads to inefficient usage of resources: e.g., the UE could be denied access to WLAN by the mobility decision function; and even though access has been denied and the UE is not using the WLAN network, it still had to connect and send several OTA messages.

Furthermore, for security purposes most UEs nowadays will not expose their permanent identity (i.e., IMSI) in step 10, but will rather submit a temporary identity (e.g., a Pseudonym or Fast re-authentication username). This prevents the WLAN network from obtaining the permanent identity right away and implies that additional methods will be needed in order to "trick" the UE to expose its IMSI.

According to an example embodiment, a common identifier is proposed that could be used to link the context of the UE in both the 3GPP and WLAN domains without the need to obtain the UE's permanent identity (i.e., IMSI). The new identifier is derived from the UE's individual identifiers in both the WLAN and 3GPP networks.

Figure 12:
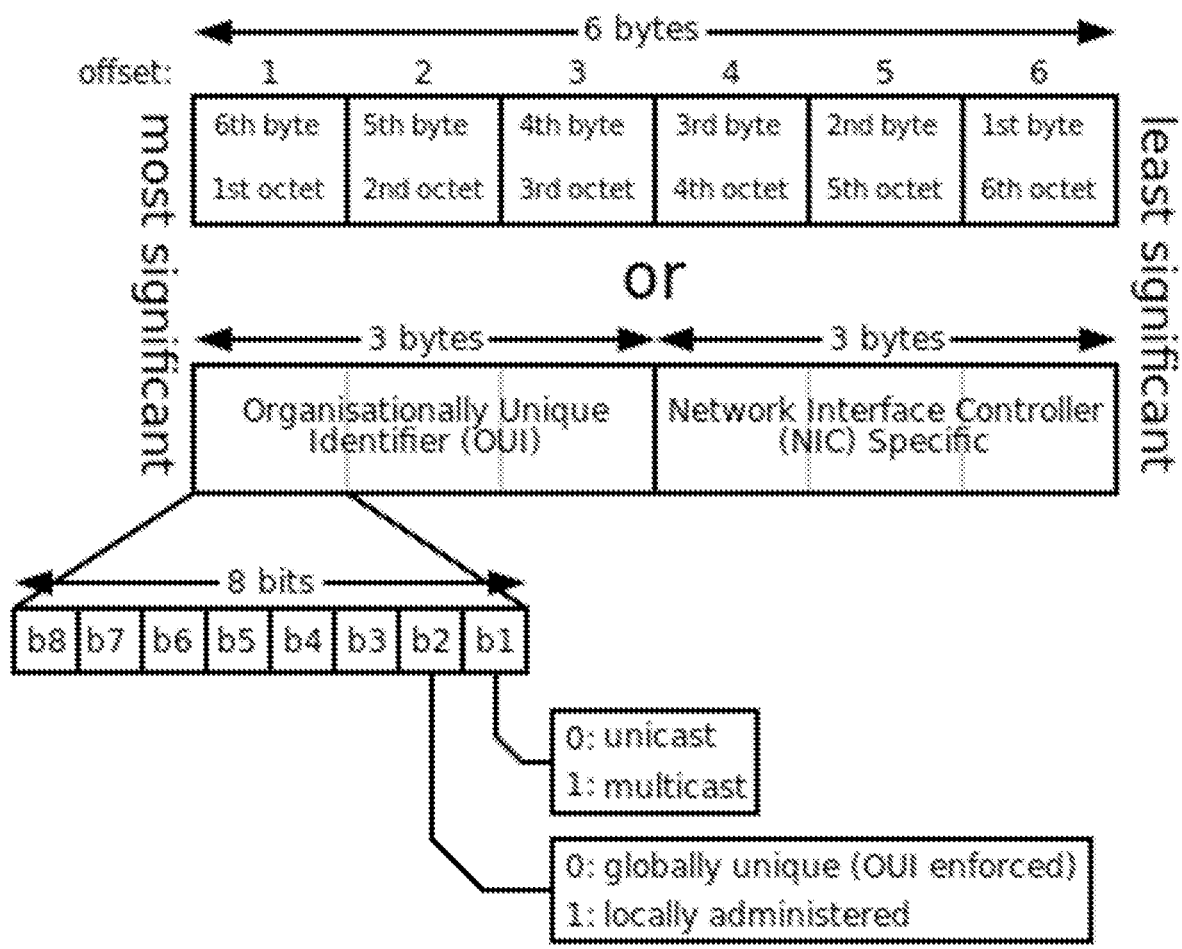
FIG. 12 is a schematic diagram illustrating an example of the structure of a MAC address.

As mentioned, currently the common identifier used to link the UE's contexts in WLAN and 3GPP or more generally cellular networks is the IMSI. The IMSI is also used in the 3GPP domain in order to identify a particular user. However, in the WLAN domain, UEs (or as mobile terminals are called in the WLAN networks, STAs) are identified by their MAC addresses. The MAC address of a STA is a unique identifier that is assigned to the wireless network interface. The MAC address has a length of 6 bytes, organized as illustrated in FIG. 12.

Naturally, the STA's MAC address is exposed every time a STA decides to transmit a frame. In that sense, a WLAN network node (AP or AC) can obtain the MAC address of the STA after the very first frame it receives from that STA.

In an example embodiment, a method may be applied to the MAC address of a STA (subsequently referred to as "Legacy_MAC") so that a modified MAC address (subsequently referred to as "New_MAC") is derived. The method comprises deriving a new MAC address based on the 3GPP identity of the UE or more generally the cellular ID. Then, the Legacy_MAC is replaced with the New_MAC. One possible implementation could be:
1. Compute New_MAC as:

New_MAC=*f*(3GPP UE ID)

In one embodiment, the function is applied to the whole MAC address and the whole 6 bytes are derived based on the 3GPP ID or more generally the cellular ID. However, another possible approach is to keep the first 3 bytes (the OUI bytes) and only apply the derivation to the last 3 bytes. In that way, some properties associated with the first 3 bytes are kept.

In one embodiment, the 3GPP or cellular identity used for the derivation could be the IMSI. In certain situations, the IMSI might not be the most appropriate identifier to use, however. For example, the 3GPP RAN does not have knowledge of the IMSI of the UE; it only knows the RAN identifiers. Hence, if a mobility decision entity needs to link the UE context from the 3GPP RAN and the WLAN, the IMSI might not serve the purpose well. Hence, other option would be to use a RAN identifier instead (e.g., C-RNTI). In that way, the radio context in both 3GPP or cellular network and the WLAN could be found without involving too many network entities. In some situations the UE could derive a New_MAC each time its C-RNTI changes (e.g., this could happen when the UE is handed over to a new 3GPP cell).

In one embodiment, the function used for the derivation of the New_MAC is a one-way function. A one-way function will improve security by preventing reverse-derivation of the UE's identifiers from the New_MAC by unauthorized entities. One example of such function could be a hashing function (e.g., HMAC-SHA-256). In the current invention, the one-way function is used in the following way:
1. eNBs inform their neighbor APs about the 3GPP UE IDs of all the UEs that are currently connected to the eNBs (i.e. when UEs are handed in or out of a cell controlled by the eNB)
2. The AP, having a list of all possible 3GPP UE IDs, derives a list of corresponding New_MACs, each associated with a particular UE
3. When a UE is steered from the eNB to the AP, it provides its New_MAC as its identification
4. The AP matches the UE's New_MAC to a certain entry in the New_MAC list it maintains and looks up the 3GPP UE ID associated with that UE
5. The AP contacts the eNB, asking for the cellular context of the UE In some situations, a certain AP can get information from two different eNBs, each reporting of the same 3GPP UE ID (i.e., if the C-RNTI was the identity in use and there are two different UEs, connected to two different eNBs and both UEs use the same C-RNTI). In this case a conflict-resolution mechanism is required. If the offloading to WLAN was initiated by the eNB (e.g., offloading command sent to the UE), then this confusion can be resolved by the AP sending a context fetch request to both eNBs, and only the eNB that has recently ordered a UE with the concerned C-RNTI to go to WLAN will respond.

If the offloading was UE initiated, however, this might be a bit harder to resolve. But one possible way is for the derivation method of the New_MAC to also consider an identifier of the UE's currently serving cell (a Cell ID). In one embodiment, the resulting derivation function might look like:

New_MAC=*f*(3GPP UE ID,3GPP Cell ID)

The resulting mechanism is:
1. When a UE decides to connect the AP, it provides its New_MAC as its identification. The New_MAC is derived based on UE's 3GPP ID and the 3GPP Cell ID of the cell that is serving the UE
2. The AP matches the UE's New_MAC to a certain entry in the New_MAC list it maintains and looks up the 3GPP ID associated with that UE. The AP maintains a list of New_MACs for each of its neighboring eNB. This list is generated through communication between AP and neighboring eNBs, where neighboring eNB's update the list of new MAC_Id's in the AP's.
3. The AP contacts the respective eNB, asking for the cellular context of the UE In one embodiment, the UE is responsible to carry the derivation on its own based on the information that is has. For example, when the UE is performing a hand-over to WLAN (or is instructed by the network to perform such a hand-over) it could trigger the procedure to compute the New_MAC prior to initiating the connection to the WLAN network. Since the UE is aware of both the Legacy_MAC and the 3GPP IDs (both the UE and Cell ones) it could autonomously derive the New_MAC.

In another embodiment, the 3GPP or cellular network is involved in the derivation of the New_MAC. One option is for the UE to communicate its Legacy_MAC to the 3GPP network and then the 3GPP network to carry the derivation and communicate the New_MAC back to the UE. Another option is for the 3GPP network to provide assistance information to the UE (e.g., token of some kind). Then the UE could derive the New_MAC using the existing information and the information provided by the 3GPP network.

In one embodiment, the WLAN network node upon reception of the STA's identity (i.e., the New_MAC) contacts a network Locator function, that provides the UE's 3GPP context (or a pointer to this context). Another option is for the WLAN network node to contact the mobility decision entity.

In another embodiment, the WLAN network node uses the information from the New_MAC in order to identify the 3GPP network node that has the UE's context. Then the WLAN network node could poll the 3GPP network node in order to provide the UE's context.

In yet another embodiment, the WLAN network node contacts all the 3GPP network nodes it already has interfaces with and polls for UE context. Interfaces can for example be established between nodes that are either in the coverage or in proximity of each other.

In one embodiment, the mobile device can use different MAC addresses when communicating to different APs. For example, if the AP is an operator deployed AP, the UE can use the New_MAC in order for the AP to link the UE's context in the cellular network to the one in WLAN. However, if the UE communicates with a non-operator deployed AP it does not need to use its New_MAC since this will not bring any benefits. Furthermore, the UE might have some WLAN context already allocated based on its Legacy_MAC (purchased access subscriptions, MAC filtering rules, etc.).

In some situations, the same AP may provide possibilities to access the network through more than one SSID. So, in more general terms, the UE can use the New_MAC when attempting communication through an SSID that is related to an operator where the operator also provide access through a cellular network (either a cellular network managed by the same operator, or, e.g., through agreements with a cellular operator). If the UE attempts communication through an SSID that is not related to a cellular operator or that is related to a cellular operator that the UE have no subscription or service capability from, it may use the Legacy_MAC instead.

In one embodiment where the New_MAC is generated from:

New_MAC=$f$(3GPP UE ID,3GPP Cell ID), the AP is able to read out 3GPP Cell ID more or less directly, and can send a request for information to the cellular network and the correct eNB directly. The Cell ID part of the New_MAC may be defined to be a certain octet or part of an octet in the MAC address format and this cell ID sequence may be correlated with a sequence that is pre-configured in the AP and where each such cell ID sequence is correlated to a specific eNB address. Then, at reception of a New_MAC from a UE, the AP can directly identify the Cell ID sequence and map to the correct eNB address and contact the correct eNB with a message including the New_MAC as an identifier of the specific UE. In the eNB a corresponding New_MAC function have created a table mapping between Cellular UE ID and New_MAC, such that it is easy to correlate the mapping between the context of the UE in the cellular network and the New_MAC.

In yet another embodiment, when an AP is contacting the cellular network to correlate information for a certain UE, it may include WLAN related information about the condition in the AP, e.g., resources, load, signal strength measurements related to communication with the specific UE, in addition to the New_MAC identity. The purpose for this may be that, e.g., a decision about steering should be made by algorithms that are implemented in the cellular network, e.g., the eNB or MME, rather than in the AP. This is simply an alternative of execution of the evaluation part after having correlated information about a certain UE in the WLAN network and the cellular network. It may be done in the AP after having received information related to the UE in the cellular network, or it may be done in, e.g., eNB, after having received information related to the UE in the WLAN network, along with the New_MAC.

In yet another embodiment, the New_MAC is formed such that it points out an MME identity of an MME connected to the eNB the UE is served by. One such identity that is already used in 3GPP is the GUTI (Global Unique Temporary Identifier), including MCC, MNC, MME Group ID, MME Code and Temporary Mobile Identity (M-TMSI). Using or indicating the GUTI in a request from a STA, the AP can directly contact the correct MME, get the address to the correct eNB and link contexts, compare performance related information etc. The GUTI could be used as it is in an initial request from the STA to the AP or, preferably, it could be shortened to mimic a MAC address format. For example:

The MCC—3 digits could be removed

The MNC—2-3 digits could be removed

The MME Group ID—16 bits could be shortened to 8 bits or simply removed. If removed, the first byte of the OUI could be kept The MME Code—8 bits could be included in total The M-TMSI—32 bits could be included in total.

There could also be other options to shorten the GUTI, e.g., to include the complete MME Group ID and use only 24 bits for the M-TMSI.

The advantage with using GUTI, preferably shortened to fit the MAC address format, is that it would not be necessary to have any information in the AP about the UE Cell ID's and their whereabouts in the cellular/3GPP domain. This means that the eNB's does not have to send any information to any AP about UE's that the AP may not ever request any information about and this significantly decreases the signaling intensity between the nodes. Only when there is a need, the AP will communicate with the eNB.

The advantage of shortening the GUTI is of course that it is not necessary to make any format changes to requests and messages on the WLAN side.

As an example, with information enabling identification of the wireless device in the cellular radio communication network available early in the communication sequence with the WLAN, it would be possible to take a decision on access point association and/or traffic steering, coordinated with the cellular network, prior to the authentication procedure(s). For example, this would reduce the load on AAA servers for wireless devices that anyway may be rejected.

As used herein, the non-limiting term "wireless device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "wireless device" should be interpreted as non-limiting terms comprising any type of wireless device communicating with a radio network node in a cellular and/or other wireless communication system including WLAN communication or any device equipped with radio circuitry for wireless communication according to any relevant standard for communication within a cellular, mobile and/or WLAN communication system.

As used herein, the non-limiting term "network node" may refer to base stations, network control nodes such as network controllers, radio network controllers, base station controllers, access points, access controllers and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

At least some specific embodiments have been described and illustrated in the non-limiting context of a 3GPP E-UTRA LTE and EPC system. The same benefits with the proposed technology would be achieved also if the cellular system would be a UMTS/UTRA system with WCDMA access. For example, in a similar way as GUTI is described to be used, in UMTS, P-TMSI may be used. In a similar way as C-RNTI and cell identities are being described for LTE, the same information elements are available in UMTS. The communication node towards the 3GPP cellular network in the UMTS case is not an eNB, but instead a Radio Network Controller, RNC. Instead of the WLAN AP or AC contacting the eNB for radio related information, the WLAN AP or AC would contact the RNC for radio related information in the UMTS/UTRA case. For UMTS, in addition to the above-mentioned identifiers it may sometimes be enough to identify the UE if the Serving RNC is known and in such situations the RNTI may be used. These identifiers are mentioned as examples.

Optionally, the wireless device and/or network node may also include communication circuitry. The communication circuitry may include functions for wired and/or wireless communication with other devices and/or network nodes in the network. In a particular example, the wireless device, and/or network node may include radio circuitry for communication with one or more other nodes, including transmitting and/or receiving information. The communication circuitry may be interconnected to a processor and/or memory.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

In a particular example, at least some of the steps, functions, procedures, modules and/or blocks described herein are implemented in a computer program 525; 535 which is loaded into the memory 520 for execution by processing circuitry including one or more processors 510. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

In this regard, reference can for example be made to the schematic example illustrated in FIG. 17.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 525; 535 may be realized as a computer program product, which is normally carried or stored on a computer-readable medium 520; 530, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus, wireless device and/or network node may be defined as a group of function modules, where each step performed by the processor corresponds to a function module. In this case, the function modules are implemented as a computer program running on the processor. Hence, the apparatus, wireless device and/or network node may be defined as a group of function modules, where the function modules are implemented as a computer program running on at least one processor.

The computer program residing in memory may thus be organized as appropriate function modules configured to perform, when executed by the processor, at least part of the steps and/or tasks described herein, for example as illustrated in FIGS. 18-22.

Alternatively it is possibly to realize the function modules predominantly by hardware modules, or alternatively by hardware. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] 3GPP TS 23.402, V12.4.0
[2] IEEE 802.11-2012
[3] IEEE 802.1X-2010
[4] RFC 4186
[5] RFC 3579

The invention claimed is:

1. A method for identifying a wireless device in a wireless communication environment that includes both a Wireless Local Area Network (WLAN) and a 3rd Generation Partnership Project (3GPP) cellular radio communication network, the method implemented by a network node in the WLAN and comprising:
  receiving an identifier of a Medium Access Control (MAC) address format from the wireless device communicating with the WLAN, wherein the identifier:
    is located in the MAC address field in one or more messages for the WLAN;
    enables identification of the wireless device in the WLAN;
    also represents information that enables identification of the wireless device in the 3GPP cellular radio communication network; and
    is a modified MAC address generated as a function of one or both of a 3GPP identity of the wireless device and a 3GPP cell identity of a cell currently serving the wireless device in the 3GPP cellular radio communication network;
  identifying the wireless device in the WLAN based on the identifier;
  identifying the wireless device in the 3GPP cellular radio communication network based on the identifier; and
  obtaining a context for the wireless device from a 3GPP network node based on the identifier of the MAC address format.

2. The method of claim 1, wherein the information that enables the identification of the wireless device in the 3GPP cellular radio communication network is 3GPP information enabling the identification of the wireless device in the 3GPP cellular radio communication network.

3. The method of claim 1, wherein the information that enables the identification of the wireless device in the 3GPP cellular radio communication network is representative of the 3GPP identity of the wireless device in the 3GPP cellular radio communication network.

4. The method of claim 1, wherein the information that enables the identification of the wireless device in the 3GPP cellular radio communication network is representative of the 3GPP identity of the wireless device on a radio access network level.

5. The method of claim 4, wherein the information that enables the identification of the wireless device in the 3GPP cellular radio communication network is representative of a Cell Radio Network Temporary Identifier (CRNTI).

6. The method of claim 1, wherein the information that enables the identification of the wireless device in the 3GPP cellular radio communication network is representative of the 3GPP identity of the wireless device on a mobility management level.

7. The method of claim 6, wherein the information that enables the identification of the wireless device in the 3GPP cellular radio communication network is representative of a Mobility Management Entity (MME) identifier and a MME-Temporary Mobile Subscriber Identity (M-TMSI).

8. The method of claim 6, wherein the information that enables the identification of the wireless device in the 3GPP cellular radio communication network is representative of at least part of a 3GPP Global Unique Temporary Identifier (GUTI).

9. The method of claim 1, wherein the network node is a WLAN access point or a WLAN access controller.

10. An apparatus in a Wireless Local Area Network (WLAN) configured to identify a wireless device in a wireless communication environment that includes both the WLAN and a 3rd Generation Partnership Project (3GPP) cellular radio communication network, the apparatus comprising:
  processing circuitry;
  memory containing instructions executable by the processing circuitry whereby the apparatus is operative to:
    receive an identifier of a Medium Access Control (MAC) address format from the wireless device communicating with the Wireless Local Area Network (WLAN), wherein the identifier:
      is located in the MAC address field in one or more messages for the WLAN;
      enables identification of the wireless device in the WLAN;
      also represents information that enables identification of the wireless device in the 3GPP cellular radio communication network; and
      is a modified MAC address generated as a function of one or both of a 3GPP identity of the wireless device and a 3GPP cell identity of a cell currently serving the wireless device in the 3GPP cellular radio communication network;
    identify the wireless device in the WLAN based on the identifier;

identify the wireless device in the 3GPP cellular radio communication network based on the identifier; and obtain a context for the wireless device from a 3GPP network node based on the identifier of the MAC address format.

11. The apparatus of claim 10, wherein the information that enables the identification of the wireless device in the 3GPP cellular radio communication network is 3GPP information enabling the identification of the wireless device in the 3GPP cellular radio communication network.

12. The apparatus of claim 10, wherein the information that enables the identification of the wireless device in the 3GPP cellular radio communication network is representative of the 3GPP identity of the wireless device on a radio access network level.

13. The apparatus of claim 10, wherein the information that enables the identification of the wireless device in the 3GPP cellular radio communication network is representative of the 3GPP identity of the wireless device on a mobility management level.

14. A network node comprising:
processing circuitry;
memory containing instructions executable by the processing circuitry whereby the network node is operative to:
receive an identifier of a Medium Access Control (MAC) address format from a wireless device communicating with a Wireless Local Area Network (WLAN), wherein the identifier:
is located in the MAC address field in one or more messages for the WLAN;
enables identification of the wireless device in the WLAN;
also represents information that enables identification of the wireless device in a 3GPP cellular radio communication network; and
is a modified MAC address generated as a function of one or both of a 3GPP identity of the wireless device and a 3GPP cell identity of a cell currently serving the wireless device in the 3GPP cellular radio communication network;
identify the wireless device in the WLAN based on the identifier;
identify the wireless device in the 3GPP cellular radio communication network based on the identifier; and
obtain a context for the wireless device from a 3GPP network node based on the identifier of the MAC address format.

15. The network node of claim 14, wherein the network node is a WLAN network node.

16. The network node of claim 15, wherein the network node is a WLAN access point or a WLAN access controller.

17. A computer program product stored in a non-transitory computer readable medium for identifying a wireless device in a wireless communication environment that includes both a Wireless Local Area Network (WLAN) and a 3rd Generation Partnership Project (3GPP) cellular radio communication network, the computer program product comprising software instructions which, when run on processing circuitry of a network node in the WLAN, causes the network node to:
read an identifier of a Medium Access Control (MAC) address format from the wireless device communicating with a Wireless Local Area Network (WLAN), wherein the identifier:
is located in the MAC address field in one or more messages for the WLAN;
enables identification of the wireless device in the WLAN;
also represents information that enables identification of the wireless device in the 3GPP cellular radio communication network; and
is a modified MAC address generated as a function of one or both of a 3GPP identity of the wireless device and a 3GPP cell identity of a cell currently serving the wireless device in the 3GPP cellular radio communication network;
identify the wireless device in the WLAN based on the identifier;
identify the wireless device in the 3GPP cellular radio communication network based on the identifier; and
obtain a context for the wireless device from a 3GPP network node based on the identifier of the MAC address format.

* * * * *